(12) United States Patent
Carberry et al.

(10) Patent No.: US 9,089,931 B1
(45) Date of Patent: Jul. 28, 2015

(54) SYSTEMS AND METHODS FOR LASER CLEAVING OPTICAL FIBERS

(71) Applicant: CORNING CABLE SYSTEMS LLC, Hickory, NC (US)

(72) Inventors: Joel Patrick Carberry, Big Flats, NY (US); Anping Liu, Horseheads, NY (US); Barada Kanta Nayak, Horseheads, NY (US)

(73) Assignee: Corning Cable Systems LLC, Hickory, NC (US)

( * ) Notice: Subject to any disclaimer, the term of this patent is extended or adjusted under 35 U.S.C. 154(b) by 282 days.

(21) Appl. No.: 13/792,412

(22) Filed: Mar. 11, 2013

(51) Int. Cl.
  G02B 6/25 (2006.01)
  B23K 26/00 (2014.01)
  B23K 26/40 (2014.01)
  B23K 26/38 (2014.01)

(52) U.S. Cl.
  CPC ............. B23K 26/38 (2013.01); B23K 26/0039 (2013.01); B23K 26/0066 (2013.01); B23K 26/4075 (2013.01); G02B 6/25 (2013.01)

(58) Field of Classification Search
  CPC ... B23K 26/0039; B23K 26/4075; G02B 6/25
  USPC ........ 65/387; 219/121.68, 121.69; 359/341.1; 372/25
  See application file for complete search history.

(56) References Cited

U.S. PATENT DOCUMENTS

| 4,147,402 A | 4/1979 | Chown ........................ 350/96.18 |
| 4,345,930 A | 8/1982 | Basola et al. ................... 65/102 |
| 4,510,005 A | 4/1985 | Nijman ......................... 156/221 |
| 4,678,268 A | 7/1987 | Russo et al. ............... 350/96.18 |
| 4,859,827 A | 8/1989 | Coyle, Jr. et al. ........ 219/121.64 |
| 4,932,989 A | 6/1990 | Presby ............................... 65/2 |
| 5,011,254 A | 4/1991 | Edwards et al. ........... 350/96.18 |
| 5,101,090 A | 3/1992 | Coyle, Jr. et al. ........ 219/121.68 |
| 5,226,101 A | 7/1993 | Szentesi et al. ................. 385/85 |
| 5,256,851 A | 10/1993 | Presby ..................... 219/121.69 |
| 5,291,570 A | 3/1994 | Filgas et al. .................... 385/78 |
| 5,317,661 A | 5/1994 | Szentesi et al. ................. 385/31 |
| 5,421,928 A | 6/1995 | Knecht et al. ................. 156/153 |
| 5,772,720 A | 6/1998 | Taira-Griffin et al. .......... 65/387 |
| 5,954,974 A | 9/1999 | Broer et al. ...................... 216/2 |
| 5,966,485 A | 10/1999 | Luther et al. ................... 385/85 |
| 6,139,196 A | 10/2000 | Feth et al. ....................... 385/97 |
| 6,246,026 B1 | 6/2001 | Vergeest .................. 219/121.72 |
| 6,282,349 B1 | 8/2001 | Griffin ............................ 385/81 |

(Continued)

FOREIGN PATENT DOCUMENTS

| WO | 01/61394 A1 | 8/2001 | ............. G02B 6/26 |
| WO | 01/61395 A1 | 8/2001 | ............. G02B 6/26 |

(Continued)

*Primary Examiner* — Samuel M Heinrich

(57) ABSTRACT

Systems and methods for laser cleaving optical fibers are disclosed. In certain embodiments discussed herein, a ferrule of a fiber optic connector with an optical fiber disposed therein may precisely position an optical surface of the optical fiber when establishing an optical connection with another optical fiber. The optical surface may be thermally formed by laser beam(s) directed to an end face of the ferrule and to an end portion of the optical fiber extending therefrom. By having at least ninety (90) percent of the light incident on the ferrule as S-polarized light, the optical surface may be formed closer to the ferrule. This is because the laser beam may be more readily reflected away from the ferrule instead of being absorbed within the ferrule and thereby causing ferrule damage.

20 Claims, 15 Drawing Sheets

(56) References Cited

U.S. PATENT DOCUMENTS

| | | | |
|---|---|---|---|
| 6,361,219 B1 | 3/2002 | Blyler, Jr. et al. | 385/85 |
| 6,413,450 B1 | 7/2002 | Mays, Jr. | 264/1.27 |
| 6,488,414 B1 * | 12/2002 | Dawes et al. | 385/79 |
| 6,509,547 B1 | 1/2003 | Bernstein et al. | 219/121.68 |
| 6,534,741 B2 | 3/2003 | Presby | 219/121.69 |
| 6,738,544 B2 | 5/2004 | Culbert et al. | 385/33 |
| 6,742,936 B1 | 6/2004 | Knecht et al. | 385/67 |
| 6,774,341 B2 | 8/2004 | Ohta | 219/121.72 |
| 6,805,491 B2 | 10/2004 | Durrant et al. | 385/76 |
| 6,817,785 B2 | 11/2004 | Tian | 385/96 |
| 6,822,190 B2 | 11/2004 | Smithson et al. | 219/121.69 |
| 6,825,440 B2 | 11/2004 | Ohta et al. | 219/121.69 |
| 6,886,991 B2 | 5/2005 | Endo | 385/78 |
| 6,888,987 B2 | 5/2005 | Sercel et al. | 385/39 |
| 6,902,327 B1 | 6/2005 | Johnson | 385/60 |
| 6,939,055 B2 | 9/2005 | Durrant et al. | 385/76 |
| 6,951,994 B2 | 10/2005 | Mays, Jr. | 219/121.67 |
| 6,955,478 B2 | 10/2005 | Durrant et al. | 385/76 |
| 6,957,920 B2 | 10/2005 | Luther et al. | 385/85 |
| 6,960,627 B2 | 11/2005 | Huth et al. | 525/59 |
| 6,963,687 B2 | 11/2005 | Vergeest et al. | 385/123 |
| 6,968,103 B1 | 11/2005 | Schroll et al. | 385/30 |
| 7,023,001 B2 | 4/2006 | Cournoyer et al. | 250/492.1 |
| 7,029,187 B2 | 4/2006 | Chapman et al. | 385/96 |
| 7,082,250 B2 | 7/2006 | Jones et al. | 385/134 |
| 7,142,741 B2 | 11/2006 | Osborne | 385/15 |
| 7,147,384 B2 | 12/2006 | Hardcastle et al. | 385/60 |
| 7,216,512 B2 | 5/2007 | Danley et al. | 65/392 |
| 7,264,403 B1 | 9/2007 | Danley et al. | 385/60 |
| 7,267,491 B2 | 9/2007 | Luther et al. | 385/85 |
| 7,306,376 B2 | 12/2007 | Scerbak et al. | 385/76 |
| 7,324,723 B2 | 1/2008 | Shioda et al. | 385/31 |
| 7,324,724 B2 | 1/2008 | Levesque et al. | 385/31 |
| 7,377,700 B2 | 5/2008 | Manning et al. | 385/72 |
| 7,419,308 B2 | 9/2008 | Ma | 385/54 |
| 7,509,004 B2 | 3/2009 | Coleman | 385/33 |
| 7,540,668 B2 | 6/2009 | Brown | 385/78 |
| 7,630,609 B1 | 12/2009 | Mays, Jr. et al. | 385/137 |
| 7,695,201 B2 | 4/2010 | Douglas et al. | 385/85 |
| 7,802,927 B2 | 9/2010 | Benjamin et al. | 385/88 |
| 8,052,836 B2 | 11/2011 | Cale et al. | 156/712 |
| 8,101,885 B2 | 1/2012 | Nakamae et al. | 219/121.77 |
| 8,104,974 B1 | 1/2012 | Gurreri | 385/72 |
| 8,109,679 B2 | 2/2012 | Danley et al. | 385/85 |
| 8,132,971 B2 | 3/2012 | Luther et al. | 385/83 |
| 8,830,567 B2 * | 9/2014 | Lin | 359/341.1 |
| 2004/0234211 A1 | 11/2004 | Durrant et al. | 385/88 |
| 2005/0008307 A1 | 1/2005 | Culbert et al. | 385/123 |
| 2005/0284852 A1 | 12/2005 | Vergeest et al. | 219/121.67 |
| 2006/0137403 A1 | 6/2006 | Barr et al. | 65/377 |
| 2006/0266743 A1 | 11/2006 | Chi et al. | 219/121.69 |
| 2008/0067158 A1 | 3/2008 | Levesque | 219/121.72 |
| 2010/0101277 A1 | 4/2010 | Gonthier et al. | 65/392 |
| 2010/0215319 A1 | 8/2010 | Childers et al. | 385/60 |
| 2010/0303416 A1 | 12/2010 | Danley et al. | 385/55 |
| 2012/0014649 A1 | 1/2012 | Duis et al. | 385/65 |
| 2012/0027356 A1 | 2/2012 | Gurreri | 385/60 |
| 2012/0027358 A1 | 2/2012 | Webb et al. | 385/78 |
| 2012/0263422 A1 * | 10/2012 | Lu | 385/85 |
| 2013/0343710 A1 * | 12/2013 | Danley et al. | 385/85 |

FOREIGN PATENT DOCUMENTS

| | | | |
|---|---|---|---|
| WO | 01/61870 A2 | 8/2001 | |
| WO | 2004/003612 A1 | 1/2004 | G02B 6/25 |
| WO | 2008/103239 A1 | 8/2008 | B23K 26/00 |

* cited by examiner

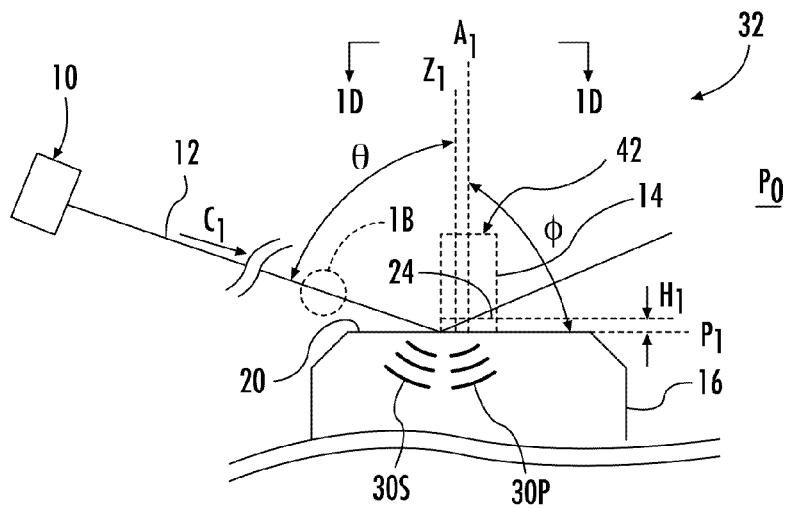
FIG. 1A
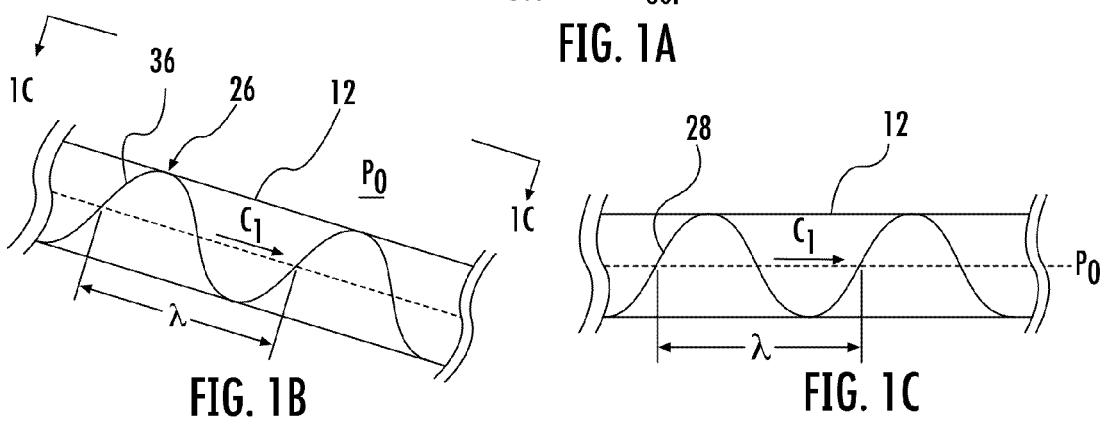
FIG. 1B
FIG. 1C
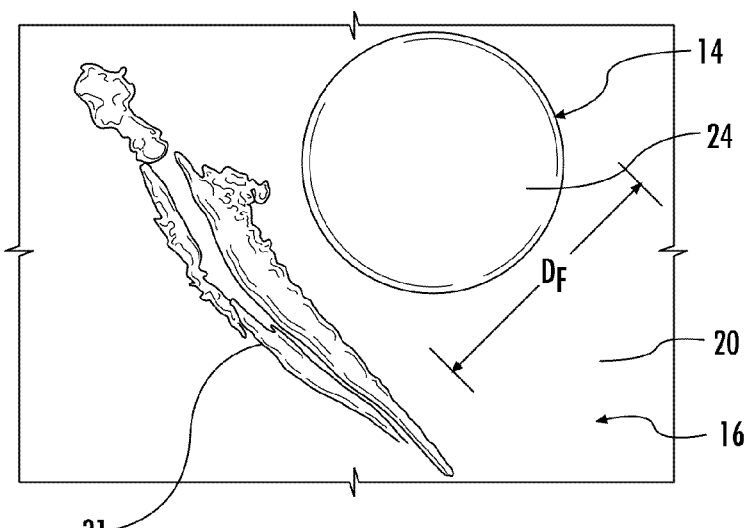
FIG. 1D

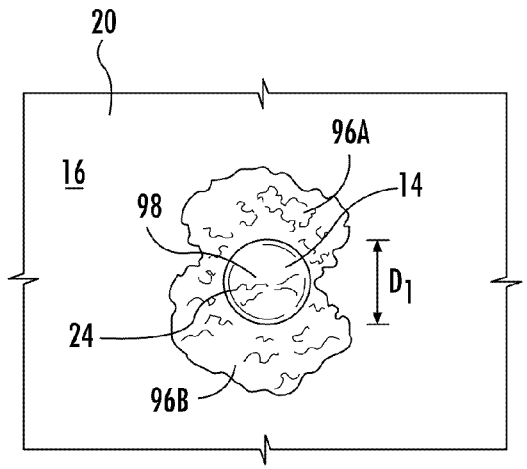
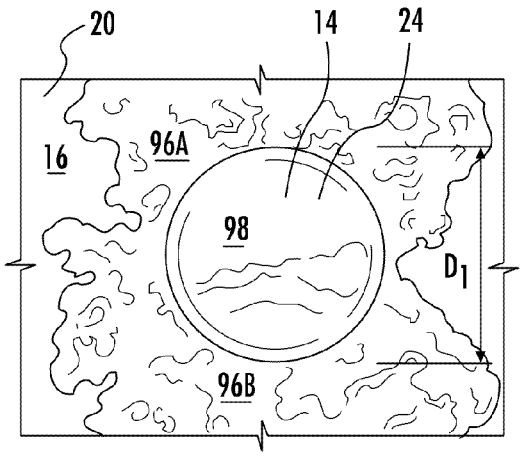
FIG. 10A    FIG. 10B
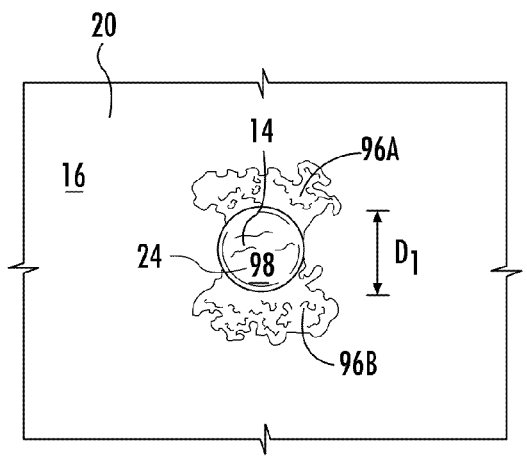
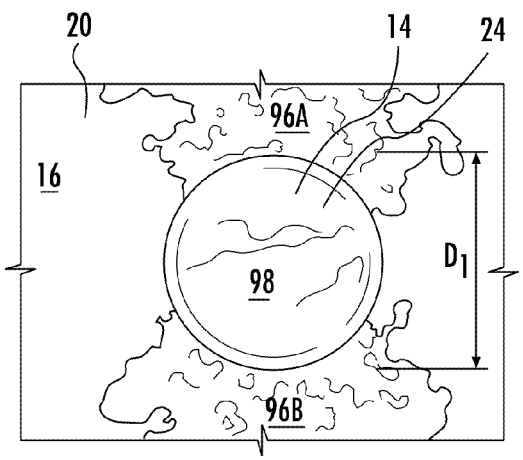
FIG. 11A    FIG. 11B
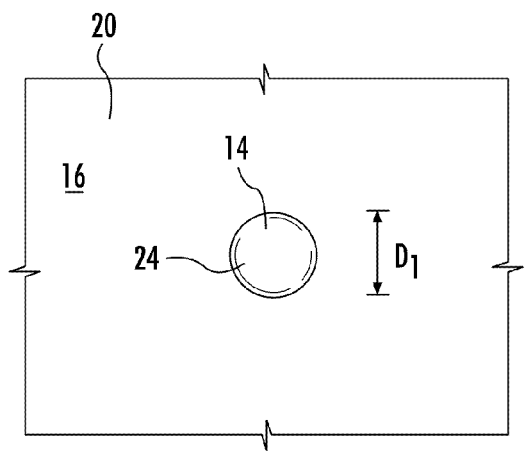
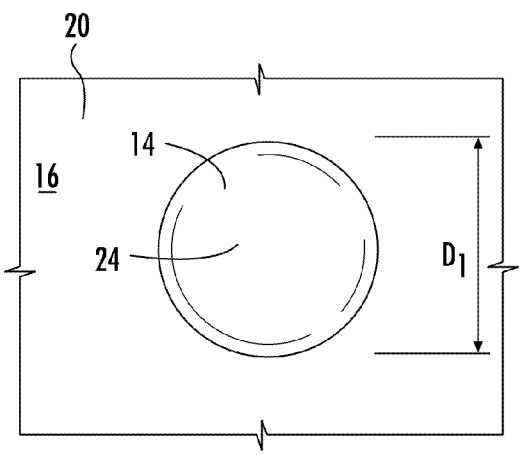
FIG. 12A    FIG. 12B

SYSTEMS AND METHODS FOR LASER CLEAVING OPTICAL FIBERS

BACKGROUND

1. Field of Disclosure

The field of the disclosure relates to creating optical surfaces at end portions of optical fibers disposed in ferrules as part of fiber optic connector assemblies to establish fiber optic connections.

2. Background

Benefits of utilizing optical fiber include extremely wide bandwidth and low noise operation. Because of these advantages, optical fiber is increasingly being used for a variety of applications, including but not limited to broadband voice, video, and data transmission in communications networks. As a result, communications networks include a number of optical interconnection points in fiber optic equipment and between fiber optic cables in which optical fibers must be interconnected via fiber optic connections. To conveniently provide these fiber optic connections, fiber optic connectors are provided. A fiber optic connector includes a housing that provides internal components for receiving, supporting, protecting, and aligning one or more end portions of optical fibers exposed from a fiber optic cable(s) when mated with other fiber optic connectors or adapters provided in fiber optic equipment or fiber optic cables. Fiber optic connectors may be installed on fiber optic cables in the field. Alternatively, fiber optic cables may be "pre-connectorized" during the manufacturing of the fiber optic cables.

To receive, support, and position an optical fiber in a fiber optic connector, a ferrule is typically provided in the fiber optic connector. A ferrule is a component that receives, supports, and positions an optical fiber with respect to a housing of a fiber optic connector. Thus, when the housing of the fiber optic connector is mated with another fiber optic connector or adapter, the optical fiber in the ferrule is positioned in a known, fixed location about the housing of the fiber optic connector. Accordingly, an optical connection may be established when the optical fiber is aligned with another optical fiber provided in the other fiber optic connector or adapter to which it is mated. In some fiber optic connectors, a "pass-through" ferrule is provided that includes a front opening at an end face of the ferrule and a rear opening on each end of a bore. The bore allows an optical fiber to pass through the ferrule to extend beyond the end face of the ferrule. An optical surface of the optical fiber may then be formed a precise distance from the end face of the ferrule according to very tight dimensional standards to reduce signal attenuation. For example, the optical surface of the optical fiber and the end face of the ferrule may need to be disposed on a common geometric plane with a sub-micron height difference. Lasers may be used to cleave the optical fiber, but conventional lasers may not be able to cleave the optical fiber close enough to the ferrule without damaging the ferrule. As a result, mechanical polishing may still be necessary.

A time-consuming and labor-intensive process including mechanical cleaving and several mechanical polishing stages are currently utilized to form the optical surface of the optical fiber at a precise distance from the end face of the ferrule in order to satisfy dimensional standards. Mechanical cleaving typically initially forms the optical surface of the optical fiber within one-hundred fifty (150) microns of the end face of the ferrule. Next, course grit mechanical polishing brings the optical surface of the optical fiber near the end face of the ferrule, for example within fifteen (15) microns. Finally, fine grit mechanical polishing may be utilized to bring the optical surface within several microns of the end face of the ferrule.

A cost effective and high-quality approach is needed to form the optical surface of the optical fiber particularly close to the end face of the ferrule without damaging and/or marking the ferrule which avoids or reduces course grit polishing and minimizes fine grit polishing of the optical surface.

SUMMARY OF THE DETAILED DESCRIPTION

Embodiments disclosed herein include systems and methods for laser cleaving optical fibers. In certain embodiments discussed herein, a ferrule of a fiber optic connector with an optical fiber disposed therein may precisely position an optical surface of the optical fiber when establishing an optical connection with another optical fiber. The optical surface may be thermally formed by laser beam(s) directed to an end face of the ferrule and to an end portion of the optical fiber extending therefrom. By having at least ninety (90) percent of the light incident on the ferrule as S-polarized light, the optical surface may be formed closer to the ferrule. This is because the laser beam may be more readily reflected away from the ferrule instead of being absorbed within the ferrule and thereby causing ferrule damage.

In this regard, a method of thermally forming an optical surface on an end portion of an optical fiber is disclosed. The method includes providing a ferrule having a first end, a second end, and a ferrule bore extending between the first end and the second end. The method may also comprise disposing an optical fiber through the ferrule bore and extending the optical fiber through an end face on the second end of the ferrule. The method may also comprise emitting a laser beam from an optical system including a laser. The laser beam may comprise at least ninety (90) percent linearly-polarized light incident on the ferrule as S-polarized light. The method may also include directing the laser beam to the end face of the ferrule and to an end portion of the optical fiber extending from the end face of the ferrule to thermally form an optical surface at the end portion of the optical fiber. In this manner, the optical surface may be formed adjacent to the end face of the ferrule without causing thermal damage to the ferrule. Thermally damaging the ferrule could cause optical attenuation or the inability of the fiber optic connector to establish an optical connection.

In another embodiment, a laser cleaving system for thermally forming an optical surface on an end portion of an optical fiber is provided. The laser cleaving system may comprise an optical system including a laser configured to emit a laser beam having at least ninety (90) percent linearly-polarized light. The laser cleaving system may also comprise a fixture configured to secure an end face of a ferrule and an end portion of an optical fiber extending from the end face of the ferrule so that the laser beam is directed incident on the end portion of the optical fiber and the end face of the ferrule. The linearly-polarized light is incident on the ferrule as S-polarized light. In this manner, the optical surface may be formed with a minimal amount of mechanical polishing.

In another embodiment, a method of thermally forming an optical surface on an end portion of an optical fiber is provided. The method may include providing a ferrule having a first end, a second end, and a ferrule bore extending between the first end and the second end. The method may also include disposing an optical fiber through the ferrule bore and extending the optical fiber through an end face on the second end of the ferrule. The method may also include emitting a laser beam from an optical system including a laser. The laser beam may comprise at least ninety (90) percent linearly-polarized light. The method may also comprise directing the laser beam to the end face of the ferrule and to an end portion of the optical fiber extending from the end face of the ferrule to thermally form an optical surface at the end portion of the optical fiber. The laser beam may be directed upon the end portion of the optical fiber and the end face of the ferrule at an incidence angle to increase a percentage point reflectivity difference at the end face of the ferrule between the S-polarized light of the laser beam and P-polarized light having the wavelength of the laser beam to within five (5) percentage points of a maximum percentage point reflectivity difference. The laser may comprise a carbon dioxide laser. The ferrule may comprise zirconium oxide and the optical fiber may comprise silicon dioxide. In this manner, the optical surface may be formed adjacent to the end face of the ferrule without causing thermal damage to the ferrule, which could cause attenuation.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF FIGURES

FIG. 1A is a side view of a laser beam directed to an end portion of an optical fiber and a ferrule to form an optical surface of the optical fiber, the side view is orientated orthogonal to a plane of incidence of the laser beam as the laser beam is incident upon the ferrule, wherein the plane of incidence is formed by a propagation direction of the laser beam as the laser beam is incident upon the ferrule and a vector perpendicular to a portion of an end face of the ferrule where the laser beam is incident;

FIG. 1B is a close-up side view illustrating the non-S-polarized light emitted by the laser beam of FIG. 1A in the form of P-polarized light, the P-polarized light being an electric field component of electromagnetic energy of the laser beam parallel to the plane of incidence;

FIG. 1C is an orthogonal view of the laser beam of FIG. 1B that illustrates S-polarized light of the laser beam, the S-polarized light being an electric field component of the electromagnetic energy of the laser beam perpendicular to the plane of incidence;

FIG. 1D is a top view of an end face of the ferrule and end portion of the optical fiber of FIG. 1A that illustrates an optical surface of the optical fiber formed by the laser beam of FIG. 1A and a thermal crack formed on an end face of the ferrule by the thermal heating caused by the contribution of the non-S-polarized light of the laser beam;

FIGS. 10A and 10B are top close-up views of an exemplary optical surface of an optical fiber extending from an end face of a ferrule after laser cleaving observed at a first magnification and a second magnification, respectively;

FIGS. 11A and 11B are top close-up views of the optical surface and the end face of FIGS. 10A and 10B, respectively, after subsequent wiping with isopropyl alcohol;

FIGS. 12A and 12B are top close-up views of the optical surface and the end face of FIGS. 11A and 11B, respectively, after subsequent hand polishing;

DETAILED DESCRIPTION

Figure 2A:
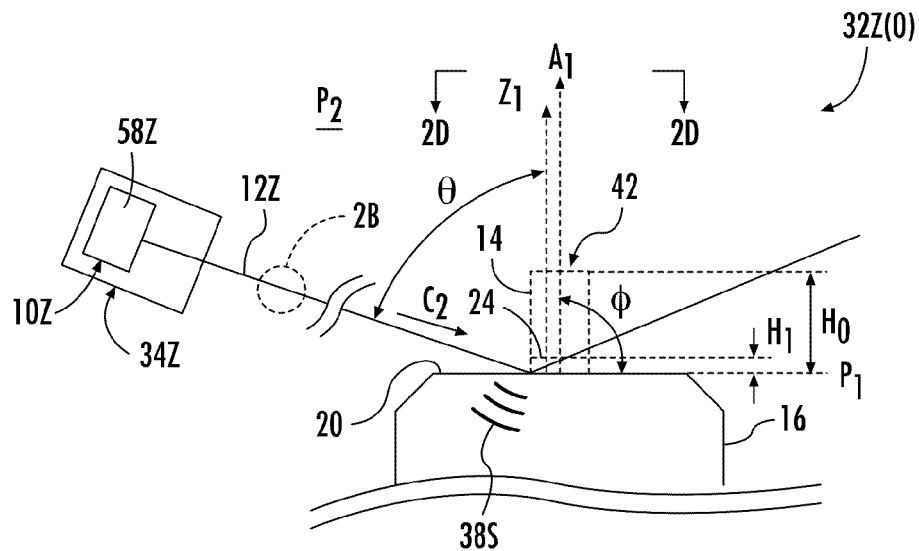
FIG. 2A is a side view of a laser beam which is linearly polarized or substantially linearly polarized and is incident on an optical fiber and ferrule illustrating the laser beam may create less thermal heating of the ferrule than the laser beam of FIG. 1A, the side view is orientated orthogonal to a plane of incidence of the laser beam as the laser beam is incident upon the ferrule, wherein the plane of incidence is formed by a propagation direction of the laser beam as the laser beam is incident upon the ferrule and a vector perpendicular to a portion of an end face of the ferrule where the laser beam is incident.

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include systems and methods for laser cleaving optical fibers. In certain embodiments discussed herein, a ferrule of a fiber optic connector with an optical fiber disposed therein may precisely position an optical surface of the optical fiber when establishing an optical connection with another optical fiber. The optical surface may be thermally formed by laser beam(s) directed to an end face of the ferrule and to an end portion of the optical fiber extending therefrom. By having at least ninety (90) percent of the light incident on the ferrule as S-polarized light, the optical surface may be formed closer to the ferrule. This is because the laser beam may be more readily reflected away from the ferrule instead of being absorbed within the ferrule and thereby causing ferrule damage.

In this regard, before discussing laser cleaving systems utilizing linearly polarized light at FIG. 2A, FIGS. 1A-1D are first discussed. FIGS. 1A-1D illustrate a laser cleaving system 32 that does not provide linearly-polarized light to form an optical surface in an optical fiber. FIGS. 1A-1D will be referenced below in conjunction with discussing exemplary challenges of using a laser beam that is not linearly-polarized to form an optical surface of an optical fiber adjacent to an end face of a ferrule.

In this regard, FIG. 1A depicts a side view of the laser cleaving system 32. The laser cleaving system 32 includes a laser 10 that is configured to emit a laser beam 12 to cleave an optical fiber 14 having optical axis $A_1$ extending from a ferrule 16. The ferrule 16 and optical fiber 14 may be part of a fiber optic connector sub-assembly of which an example is provided at the end of this disclosure. The laser beam 12 is beneficially incident upon an end portion 42 of the optical fiber 14 to transfer energy in the form of the laser energy to cleave the optical fiber 14 to form the optical surface 24 adjacent to the end face 20 of the ferrule 16 by, for example, melting or ablation. The laser beam 12 is also incident on the end face 20 of the ferrule 16, because it may be difficult to cleave the optical fiber 14 adjacent to the ferrule 16 utilizing the laser beam 12 without having at least a portion of the laser beam 12 being incident upon the ferrule 16. The side view of FIG. 1A is orientated orthogonal to a plane of incidence $P_O$ of the laser beam 12 as the laser beam 12 is incident upon the ferrule 16, wherein the plane of incidence $P_O$ is formed by a propagation direction $C_1$ of the laser beam 12 as the laser beam 12 is incident upon the ferrule 16 and a vector $Z_1$ perpendicular to a portion of an end face 20 of the ferrule 16 where the laser beam 12 is incident. In this manner, the laser beam 12 may be used to form the optical surface 24 at a height $H_1$ from the end face 20 of the ferrule 16, which may be co-planar with, or within several microns of, a geometric plane $P_1$ disposed at, or tangent to, the end face 20 of the ferrule 16.

FIG. 1B is a sectional close-up side view of the laser beam 12 showing non-S-polarized light 26 at a wavelength λ and FIG. 1C is an orthogonal view of FIG. 1B showing S-polarized light 28 at the wavelength λ. The wavelength λ may be, for example, 10.6 microns. The laser beam 12 may contain the non-S-polarized light 26 and the S-polarized light 28. P-polarized light 36 is a special case of the non-S-polarized light 26 which is orthogonal to the S-polarized light 28. The non-S-polarized light 26, the S-polarized light 28, and the P-polarized light 36 are electric field components of electro-magnetic radiation of the laser beam 12 that are traverse waves oscillating perpendicularly to the propagation direction $C_1$. The three-dimensional traverse waves of the electric field of the electro-magnetic radiation of the laser beam 12 may be represented by a vector sum of the S-polarized light 28 and the P-polarized light 36. The P-polarized light 36 is parallel to the plane of incidence $P_O$ and the S-polarized light 28 is perpendicular to the plane of incidence $P_O$.

The non-S-polarized light 26 (represented by the P-polarized light 36) and the S-polarized light 28 may be incident upon the ferrule 16 with an incidence angle θ (theta) and may be safely reflected off the ferrule 16 or otherwise may potentially be harmfully absorbed into the ferrule 16 as thermal energies 30P, 30S, respectively. It is noted that the incidence angle θ (theta) may be measured from the vector $Z_1$ disposed perpendicular to the end face 20 of the ferrule 16. In FIG. 1A the end face 20 is depicted perpendicular to the optical axis $A_1$ as labeled by angle φ (phi), but other non-perpendicular orientations are also possible for angle φ. As shown in FIG. 1D, the thermal energies 30P, 30S (FIG. 1A) absorbed by the ferrule 16 may cumulatively cause thermal damage to the end face 20 of the ferrule 16 in the form of at least one thermal crack 31. The thermal crack 31 may be near the optical fiber 14 which, for example, may be one-hundred twenty-five (125) microns. Attenuation may result when the thermal crack 31 causes the end face 20 to be imprecisely mated with another optical device (not shown).

Figure 2B:
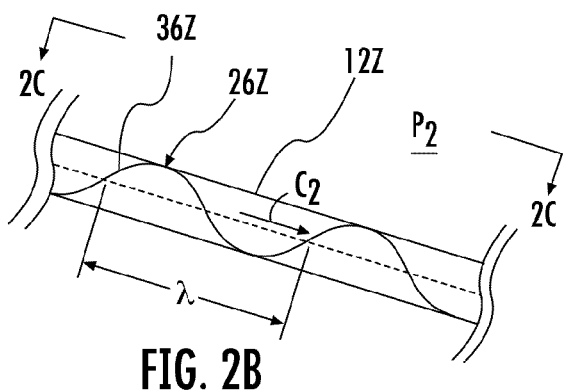
FIG. 2B is a close-up side view of the laser beam of FIG. 2A that illustrates P-polarized light of the laser beam which is an embodiment of non-S-polarized light, the P-polarized light being an electric field component of electromagnetic energy of the laser beam parallel to the plane of incidence.
Figure 2C:
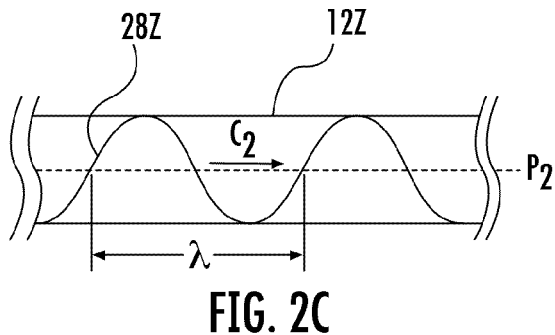
FIG. 2C is an orthogonal view of the laser beam of FIG. 2B that illustrates S-polarized light of the laser beam, the S-polarized light being an electric field component of electromagnetic energy of the laser beam perpendicular to the plane of incidence.
Figure 2D:
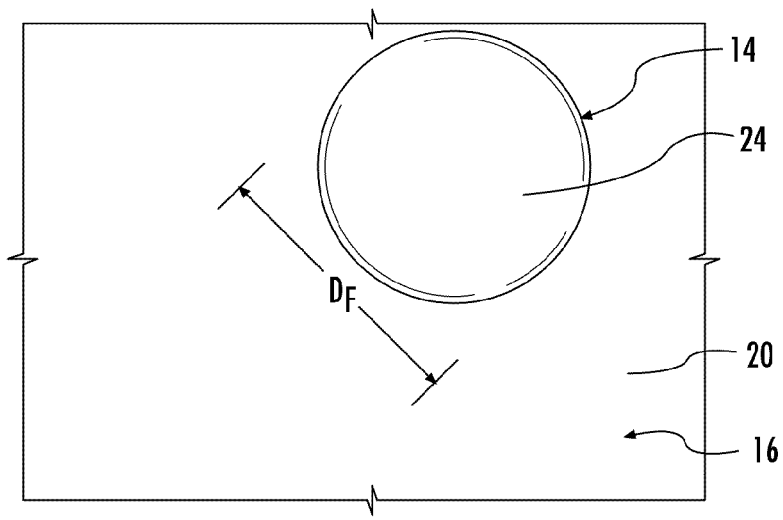
FIG. 2D is a top view of the ferrule and optical fiber of FIG. 2A that illustrates an optical surface of the optical fiber formed by the laser beam of FIG. 2A and an end face of the ferrule free from defects caused by thermal heating from the laser beam.

It was discovered that the S-polarized light 28 may be more readily reflected from the ferrule 16 than non-S-polarized light 26 and thereby may cause less thermal heating. Consistent with this discovery, FIG. 2A depicts a side view of a laser cleaving system 32z(0) comprising an optical system 34z including a laser 10z emitting at least one laser beam 12z. The laser 10z may be a carbon dioxide laser 58z emitting the laser beam 12z with the wavelength λ of 10.6 microns. The laser beam 12z as emitted from the optical system 34z includes at least ninety (90) percent linearly polarized or substantially linearly polarized light configured to be incident upon the end face 20 of the ferrule 16 as S-polarized light 28z (FIG. 2C). The laser beam 12z may be incident upon the end face 20 of the ferrule 16 and the end portion 42 of the optical fiber 14. The side view of FIG. 2A is orientated orthogonal to a plane of incidence $P_2$ of the laser beam 12z as the laser beam 12z is incident upon the end face 20 of the ferrule 16. The plane of incidence $P_2$ is formed by a propagation direction $C_2$ of the laser beam 12z as the laser beam 12z is incident upon the ferrule 16 and the vector $Z_1$ perpendicular to a portion of the end face 20 of the ferrule 16 where the laser beam 12z is incident. It is noted that if the laser beam 12z is less than one-hundred (100) percent S-polarized light 28z, then the laser beam 12z includes non-S-polarized light 26z (FIG. 2B) of which P-polarized light 36z may be one embodiment. The P-polarized light 36z is orientated parallel to the plane of incidence $P_2$ and the S-polarized light 28z (FIG. 2C) being perpendicular to the plane of incidence $P_2$. As the laser beam 12z comprises the at least ninety (90) percent S-polarized light 28z, the laser beam 12z may be more readily reflected by the end face 20 of the ferrule 16, and thereby the ferrule 16 may be subjected primarily to thermal heating 38S from the S-polarized light 28z. Accordingly, the thermal heating 38P (FIG. 1A) may be avoided (or reduced) during the forming of the optical surface 24 adjacent to the end face 20 of the ferrule 16 and the ferrule 16 may remain smooth and defect-free (FIG. 2D).

There is more than a composition of the laser beam 12z that may be adjusted to reduce thermal heating of the ferrule 16, an incidence angle θ at which the laser beam 12z is incident upon the ferrule 16 may also be adjusted reduce thermal heating. For example, if the laser beam 12z is incident to the ferrule 16 at high incidence angles θ, for example above eighty-five (85) degrees, a majority of both the S-polarized light 28z and the non-S-polarized light 26z reflects off the ferrule 16 and thereby minimal thermal heating is created to damage the ferrule 16. However, for conically-shaped laser beams, values above eighty-five (85) degrees may not be desirable because a light ray of the laser beam 12z closest to the end face 20 of the ferrule 16 may be preferably orientated parallel to the end face 20 of the ferrule 16 to thereby form the optical surface 24 of the optical fiber 14 parallel to the end face 20 of the ferrule 16. It is noted that as the incidence angle θ of the laser beam 12z may be reduced, the reflectivity of the non-S-polarized light 26z may fall off more rapidly than the S-polarized light 28z of the laser beam 12z, thereby creating an optimal range of the incidence angle θ wherein the S-polarized light 28z may remain relatively more reflective to the ferrule 16 compared to the non-S-polarized light 26z. Accordingly, when the laser beam 12z may be directed to the ferrule 16 within this optimal range of the incidence angle θ, the optical surface 24 of the optical fiber 14 may be formed more parallel to the end face 20 of the ferrule 16. Further, the ferrule 16 may be less likely to be damaged by thermal energy because the S-polarized light 28z, which may comprise at least ninety (90) percent of the energy of the laser beam 12z, may be safely reflected away from the ferrule 16 while any of the non-S-polarized light 26z of the laser beam 12z, which may also be incident on the ferrule 16, may be eliminated or minimized by the linear polarization or substantial linear polarization of the laser beam 12z.

Now that adjusting the S-polarized light 28z of the laser beam 12z and the incidence angle θ of the laser beam 12z have been introduced to reduce thermal heating of the ferrule 16, an exemplary laser cleaving system 32z(1) is discussed which may be used to thermally form the optical surface 24 on the end portion 42 of the optical fiber 14 adjacent the ferrule 16 of FIG. 2A. The laser cleaving system 32z(1) will be discussed in conjunction with FIG. 3 which is a flow chart diagram of an exemplary method 44 including blocks 46A-46D for thermally forming the optical surface 24 on the end portion 42 of the optical fiber 14. In this manner, FIG. 4A is a schematic diagram of the laser cleaving system 32z(1) including the optical system 34z having the laser 10z, a focusing-scanning system 48(1) having a focusing lens 50 and a reflective mirror 52, and a fixture 54 for holding the ferrule 16. The method 44 may include providing the ferrule 16 as depicted later in FIG. 16 having a first end 45, a second end 46, and a ferrule bore 49 extending between the first end 45 and the second end 46 (Block 46A in FIG. 3). The method 44 may also include disposing the optical fiber 14 through the ferrule bore 49 and extending the optical fiber 14 through the end face 20 on the second end 46 of the ferrule 16 (Block 46B in FIG. 3).

Figure 3:
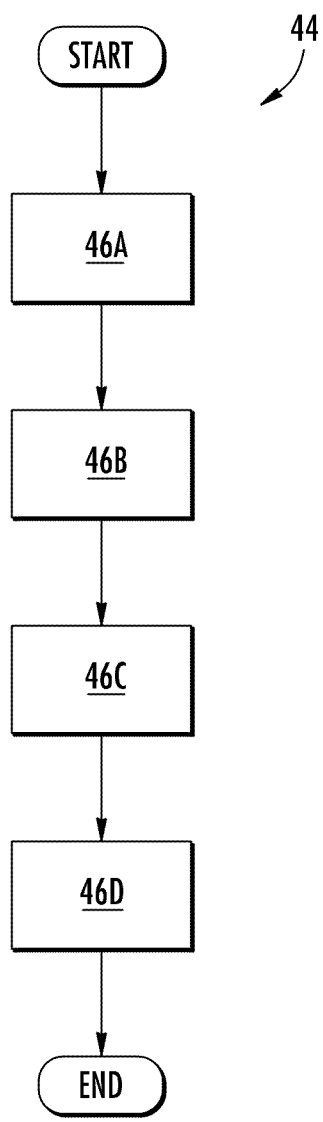
FIG. 3 is a flowchart diagram of an exemplary process of thermally forming the optical surface of the optical fiber of FIG. 2A adjacent the end face of the ferrule with a laser beam which has been linearly polarized or substantially linearly polarized to filter at least a portion of non-S-polarized light.
Figure 4A:
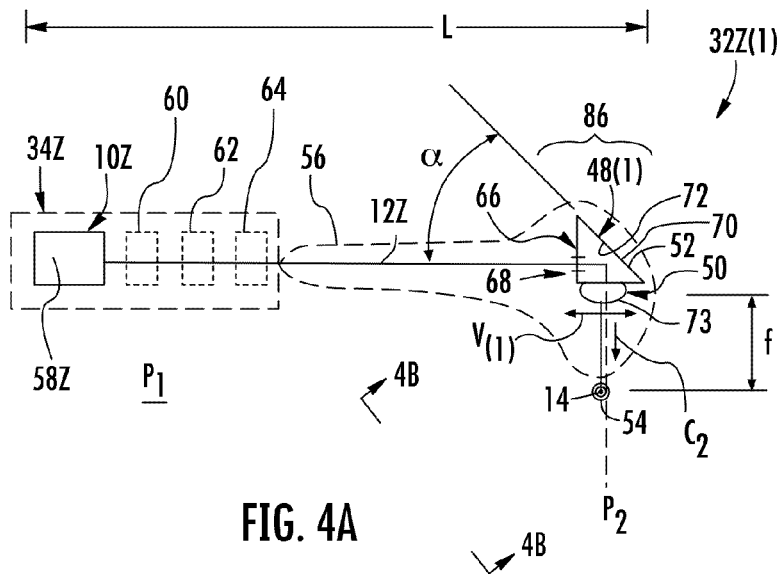
FIG. 4A is a schematic diagram of an exemplary laser cleaving system for thermally forming the optical surface adjacent the ferrule of FIG. 2A that illustrates components of the laser cleaving system comprising an optical system with a laser configured to emit the laser beam which has been linearly polarized or substantially linearly polarized.
Figure 4B:
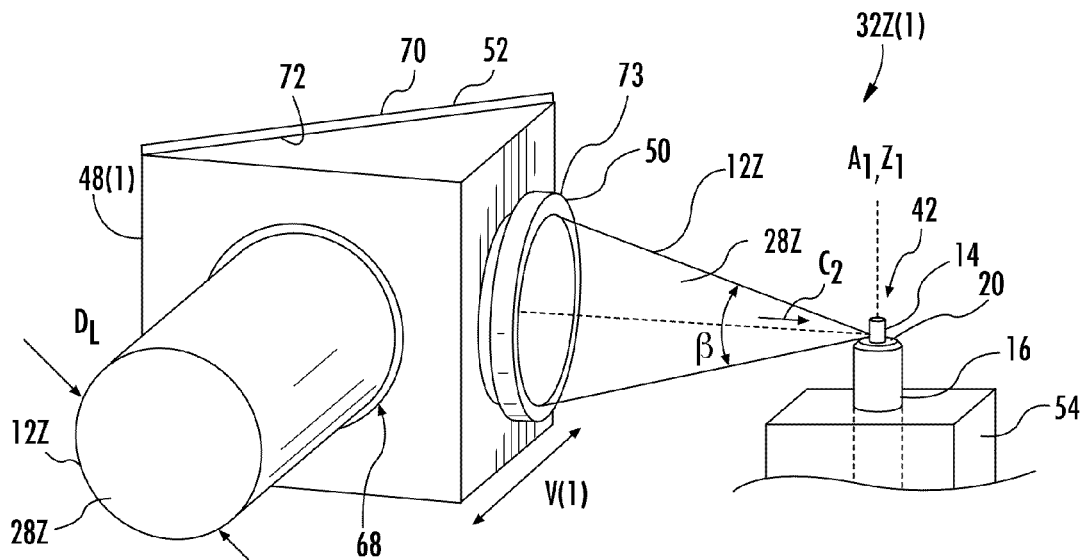
FIG. 4B is a top perspective view of a portion of the laser cleaving system of FIG. 4A that illustrates the laser beam reflected by a reflective mirror and focused by a focusing lens upon the optical fiber of FIG. 2A.

In order to provide close-up details of the operation of the laser cleaving system 32z(1), FIG. 4B is a top perspective view of the focusing-scanning system 48(1) of the laser cleaving system 32z(1). The focusing-scanning system 48(1) directs a laser beam 12z emitted from the optical system 34z of FIG. 4A to the optical fiber 14 and the ferrule 16. As shown in FIG. 4B, the ferrule 16 may be secured by the fixture 54. The optical system 34z (FIG. 3A), the focusing-scanning system 48(1), and the fixture 54 are discussed sequentially below.

The optical system 34z, which comprises the laser 10z, emits the laser beam 12z (Block 46C of FIG. 3). With continued reference to FIGS. 4A and 4B, the optical system 34z may provide laser energy in the form of the laser beam 12z to cleave the optical fiber 14 and thereby thermally form the optical surface 24 on the end portion 42 of the optical fiber 14. The laser beam 12z created by the optical system 34z may comprise at least ninety (90) percent linearly-polarized light, which may be aligned to be incident to the end face 20 of the ferrule 16 as the S-polarized light 28z. As discussed in more detail later, the S-polarized light 28z more readily reflects off the ferrule 16 to prevent thermal damage as opposed to the non-S-polarized light 26z, which would be more likely to be absorbed by the ferrule 16 and thereby cause thermal damage.

With continued reference to FIGS. 4A and 4B, the laser beam 12z may be emitted by the laser 10z of the optical system 34z at the wavelength λ in an optical pathway 56 leading to the optical fiber 14 and the ferrule 16. The laser 10z may be, for example, a carbon dioxide laser 58z emitting the laser beam 12z with a wavelength of 10.6 microns. In one embodiment, the laser 10z may be a Diamond™ C-20A laser manufactured by Coherent Incorporated of Santa Clara, Calif. In the preferred embodiment, the laser 10z may be a carbon dioxide laser 58z with at least five (5) watts emitting laser power at pulsed durations of ten (10) nanoseconds or longer.

The laser 10z may emit the laser beam 12z with substantially linearly polarized light or linearly polarized light. Although the laser beam 12z may comprise the at least ninety (90) percent linearly polarized light, one-hundred (100) percent linearly polarized light is preferred to eliminate the non-S-polarized light 26z, which may be more likely to damage the ferrule 16 rather than the S-polarized light 28z. The optical system 34z may optionally include a polarizer 60 to linearly polarize the laser beam 12z in case the laser beam 12z from the laser 10z may not be sufficiently linearly polarized. The optical system 34z may also include a waveplate 62 or polarization rotator 64 to align the linearly polarized light of the laser beam 12z to be incident upon the ferrule 16 as the S-polarized light 28z.

The method 44 may also include directing the laser beam 12z to the end face 20 of the ferrule 16 and to the end portion 42 of the optical fiber 14 extending from the end face 20 of the ferrule 16 to thermally form the optical surface 24 of the end portion 42 of the optical fiber 14 (Block 46D of FIG. 3). The focusing-scanning system 48(1) may receive the laser beam 12z with an emitted spot size $D_L$ from the optical system 34z and may precisely focus and direct the laser beam 12z to the end portion 42 of the optical fiber 14 and the end face 20 of the ferrule 16 so that the optical fiber 14 may be cleaved. In this manner, the focusing-scanning system 48(1) works in conjunction with the optical system 34z to establish the optical pathway 56 (FIG. 4A) of the laser beam 12z from the optical system 34z to the optical fiber 14 and ferrule 16.

In order to direct and focus the laser beam 12z, the focusing-scanning system 48(1) may include the reflective mirror 52 and the focusing lens 50, respectively. In a non-limiting embodiment shown in FIGS. 4A and 4B, the reflective mirror 52 may be connected to the focusing lens 50 with a hollow enclosure 66. The hollow enclosure 66 may include an opening 68 to allow the laser beam 12z to enter the hollow enclosure 66 within which the laser beam 12z may be reflected by the reflective mirror 52 before exiting the hollow enclosure 66 through the focusing lens 50. The hollow enclosure 66 may enable precise scanning of the laser beam 12z upon the end portion 42 of the optical fiber 14 by fixing the relative position of the reflective mirror 52 and the focusing lens 50. Specifically, the focusing-scanning system 48(1) may translate back and forth at a velocity of V(1) (FIG. 4A) parallel to the laser beam 12z as the laser beam 12z exits the focusing-scanning system 48(1). Accordingly, the laser beam 12z is scanned across the end portion 42 of the optical fiber 14 to enable a more uniform heat distribution of the laser beam 12z across the optical fiber 14 and thereby improve the uniform quality of the optical surface 24 produced. The velocity V(1) may comprise, for example, a maximum speed of two (2) meters per second. In this manner, a number of changes in direction by the laser beam 12z through the optical pathway 56 from the optical system 34z and through the focusing lens 50 may be unchanged as the focusing-scanning system 48(1) translates to reduce undesirable variation of the laser beam 12z exiting the focusing lens 50 during scanning.

The reflective mirror 52 may change the direction of the laser beam 12z to reduce a length L of the laser cleaving system 32z(1) and to direct the laser beam 12z to the end portion 42 of the optical fiber 14. The reflective mirror 52 may comprise, for example, a substrate 70 with a polished surface 72 plated with a highly-reflective material, for example, silver, copper, or gold to reflect the laser beam 12z having the wavelength λ. The polished surface 72 may be disposed at an angle α (alpha), for example, forty-five (45) degrees to the laser beam 12z as incident upon the polished surface 72. In this non-limiting example, the laser beam 12z may be reflected ninety (90) degrees toward the end portion 42 of the optical fiber 14 and the end face 20 of the ferrule 16 where an intensity of the laser beam 12z needs to be strong enough to cleave the optical fiber 14 to form the optical surface 24.

Figure 5:
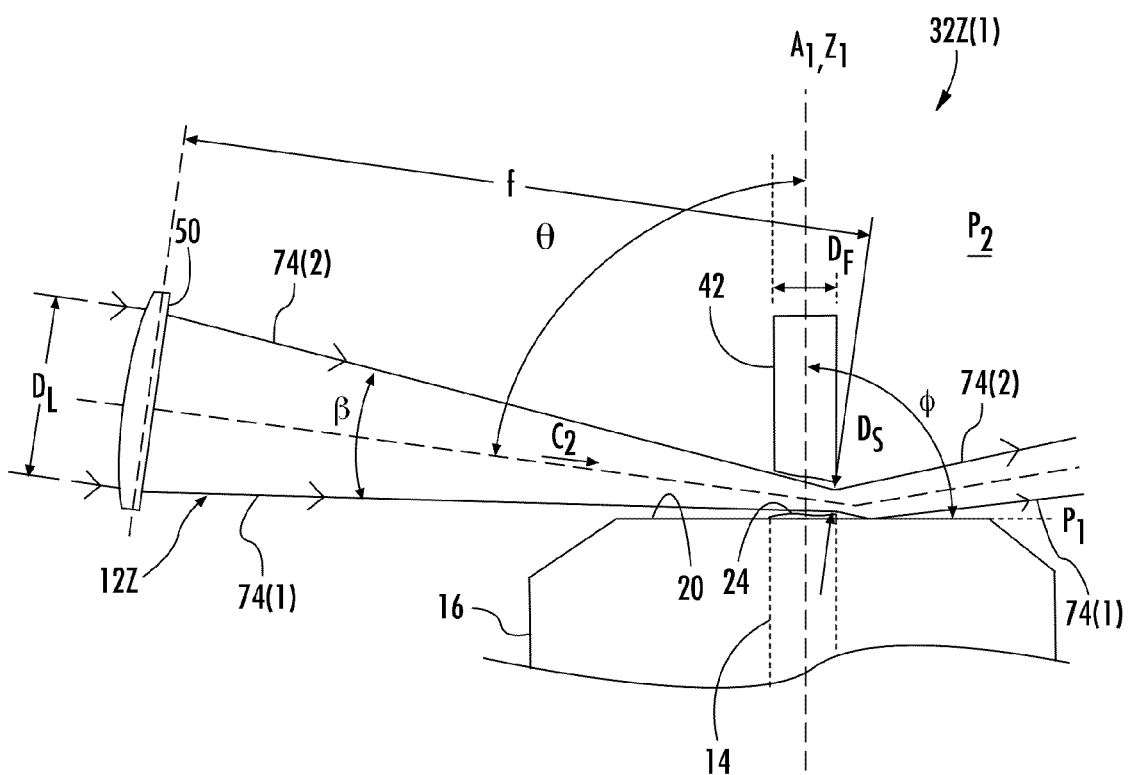
FIG. 5 is another side view of the laser beam of FIG. 4A focused and incident upon to the end portion of the optical fiber and the end face of the ferrule illustrating converging light rays of the laser beam which are focused and incident upon the end portion of the optical fiber.

FIG. 5 is another side view of the laser beam 12z of FIG. 4A focused and incident upon the end portion 42 of the optical fiber 14 and the end face 20 of the ferrule 16. It is noted that the side view of FIG. 5 is orthogonal to the plane of incidence $P_2$ of the laser beam 12z upon the end face 20 of the ferrule 16. The focusing lens 50 of the laser cleaving system 32z(1) may increase the intensity of the laser beam 12z. Intensity of the laser beam 12z may be inversely proportional to an incident spot size $D_S$ of the laser beam 12z. The focusing lens 50 may focus the laser beam 12z on the end portion 42 of the optical fiber 14 to reduce the incident spot size $D_S$ of the laser beam 12z and thereby increase the intensity of the laser beam 12z at the end portion 42 of the optical fiber 14 to rapidly form the optical surface 24 of the optical fiber 14. The incident spot size $D_S$ of the laser beam 12z may be dependent upon several factors including the wavelength λ of the laser beam 12z, an intensity distribution profile of the laser beam 12z, an optical quality of the focusing lens 50, the focal length f of the focusing lens 50, and the emitted spot size $D_L$ (FIG. 4B) of the laser beam 12z received by the focusing lens 50. In a non-limiting example, the laser beam 12z which may comprise collimated light having a wavelength between 266 nanometers and 11000 nanometers as emitted by the optical system 34z with the emitted spot size $D_L$ of one-thousand eight-hundred (1800) microns and be subsequently focused by the focusing lens 50 to the incident spot size $D_S$ (FIG. 5) of one-hundred fifty (150) microns upon the optical fiber 14 having a diameter $D_F$ of one-hundred twenty-five (125) microns. With the higher intensity commensurate with a smaller value of the incident spot size $D_S$, the optical surface 24 may be formed in less than ten (10) seconds.

The focusing lens 50 may be, for example, a biconvex spherical lens 73. The focusing lens 50 may comprise an optical material having high transmissibility to be energy efficient and low absorption to have a longer life expectancy when focusing the laser beam 12z of the wavelength λ. In a non-limiting example, the focusing lens 50 may comprise zinc selenide (ZnSe) which may have less than 0.2 percent absorption when focusing a wavelength λ of 10.6 microns. The focal length f may be, for example, between 1.5 inches and 2.5 inches and preferably two (2) inches to minimize a size of the laser cleaving system 32z(1) yet provide sufficient distance to focus the laser beam 12z. In one embodiment, the focusing lens 50 may be, for example, a Duralens™ lens manufactured by Ophir Optronics Solutions Ltd. of Jerusalem, Israel.

The optical surface 24 of the optical fiber 14 may be ideally located parallel and as close as possible to the end face 20 of the ferrule 16. In a non-limiting example, the optical surface 24 may be planar-shaped. In this manner, a light ray 74(1) of the laser beam 12z closest to the end face 20 of the ferrule 16 may be disposed parallel (or tangent) to the end face 20 of the ferrule 16 to cleave the optical fiber 14 and thereby form the optical surface 24 approximately parallel and as close as possible to the end face 20 of the ferrule 16.

With continued reference to FIG. 5, the laser beam 12z may include the light ray 74(1) which is convergent with the light ray 74(2) of the laser beam 12z furthest from the end face 20 of the ferrule 16. The light rays 74(1), 74(2) are focused and directed by the focusing lens 50 upon the end portion 42 of the optical fiber 14 with a cone angle β (beta). By having the light ray 74(1) parallel to the end face 20 of the ferrule 16, the optical surface 24 may be formed more parallel to the end face 20 of the ferrule 16. Accordingly, the incidence angle θ (theta) required to dispose the light ray 74(1) parallel to the end face 20 of the ferrule 16 may be calculated as the angle φ (phi) less half of the cone angle β (beta). In a non-limiting example, the incidence angle θ (theta) may be eight (80) degrees for a laser beam 12z having a cone angle β (beta) of twenty (20) degrees incident upon an end face 20 of the ferrule 16 orientated at an angle φ (phi) of ninety (90) degrees.

In order for the laser beam 12z to be incident upon the end face 20 of the ferrule 16 and the end portion 42 of the optical fiber 14 at the desired incidence angle θ (theta), the ferrule 16 may be secured by the fixture 54. The fixture 54 may secure the ferrule 16 so that the end portion 42 of the optical fiber 14 may be disposed at the focal length f of the focusing lens 50 to be exposed to the increased intensity provided by the incident spot size $D_S$ of the laser beam 12z at the focal length f as discussed above. The fixture 54 may secure the ferrule 16 so that the laser beam 12z may be incident upon the end face 20 of the ferrule 16 precisely at the incidence angle θ (theta) to thermally form the optical surface 24 of the optical fiber 14 as parallel and as close as possible.

Figure 6A:
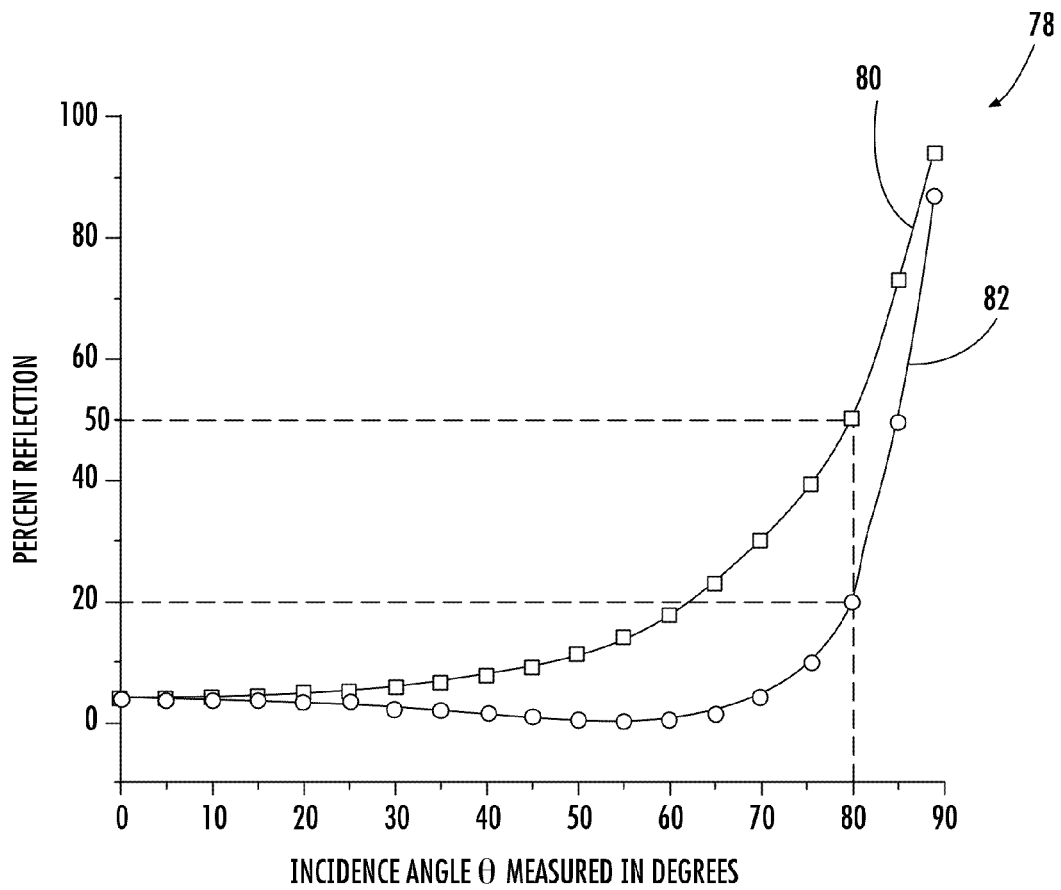
FIG. 6A is a chart of a percentage of S-polarized light and a percentage of P-polarized light of a laser beam having a wavelength of 10.6 microns which are reflected from zirconia having a refraction index of 1.501 as a function of incidence angle.
Figure 6B:
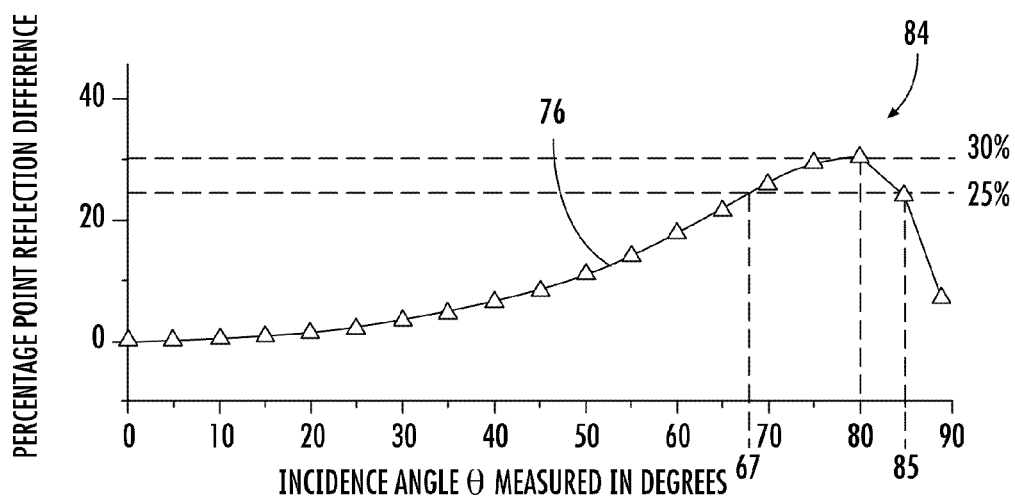
FIG. 6B is a chart of a percentage point reflectivity difference of the S-polarized light and the P-polarized light of the reflectivity data of FIG. 6A that illustrates a maximum percentage point reflectivity difference at an incidence angle of eighty (80) degrees.

Major features of the laser cleaving system 32z(1) have been discussed including the optical system 34z, the focusing-scanning system 48(1), and the fixture 54. Now, the incidence angle θ (theta) may be discussed in more detail to further protect the ferrule 16 from thermal damage resulting from laser energy that may be absorbed by the ferrule 16 instead of being safely reflected away. FIGS. 6A and 6B depict that the incidence angle θ (theta) of the laser beam 12z upon the end face 20 of the ferrule 16 may be optimized to protect the ferrule 16 from thermal damage by increasing a percentage point difference 76 (FIG. 6B) between a percentage reflection 80 of the S-polarized light 28z and a percentage reflection 82 of the P-polarized light 36z which is an embodiment of the non-S-polarized light 26z. Specifically, FIG. 6A depicts a first chart 78 of a percent reflection 80 of the S-polarized light 28z of the laser beam 12z and a percentage reflection 82 of the P-polarized light 36z of the laser beam 12z incident upon the ferrule 16 versus an incidence angle θ (theta). The ferrule 16 comprises zirconium oxide in a non-limiting example upon which the first chart 78 is based.

FIG. 6B depicts a second chart 84 of the percentage reflection 80 of FIG. 6A less the percentage reflection 82 of FIG. 6A as the percentage point difference 76 versus incidence angle θ (theta). Values of the incidence angle θ (theta) in degrees are provided on the X-axes of FIGS. 6A and 6B labeled "Incidence Angle θ Measured In Degrees." The percent reflection at a given incidence angle θ is provided on the Y-axis in FIG. 6A as "Percent Reflection" and the percentage point difference is provided on the Y-axis in FIG. 6B as "Percentage Point Reflection Difference."

With continued reference to FIGS. 6A and 6B, a higher percentage of the S-polarized light 28z is reflected from the ferrule 16 than the P-polarized light 36z for incidence angles θ between zero (0) degrees to ninety (90) degrees. The percentage reflection 80 of the S-polarized light 28z increases at a higher rate than the percentage reflection 82 of P-polarized light 36z as the incidence angle θ (theta) increases from zero to eighty (80) degrees. Accordingly, the percentage point difference 76 between the percentage reflection 80 of the S-polarized light 28z and the percentage reflection 82 of P-polarized light 36z increases with increasing incidence angle θ (theta). The percentage point difference 76 peaks at the incidence angle of eighty (80) degrees where the percentage point difference 76 depicted in FIG. 6B is thirty (30) degrees.

As the incidence angle θ (theta) may be increased above eighty (80) degrees, the percentage reflection 82 of the P-polarized light 36z increases at a faster rate than the percentage reflection 80 of the S-polarized light 28z and thereby the reflectivity advantage of the S-polarized light 28z over P-polarized light 36z diminishes. However, the percentage point difference 76 only varies five (5) percent between the incidence angles θ (theta) of sixty-seven (67) and eighty-five (85) degrees. Accordingly, the fixture 54 may reduce the thermal damage of the ferrule 16 by securing the end face 20 of the ferrule 16 so that the incidence angle θ (theta) of the laser beam 12z has the incidence angle θ (theta) between sixty-seven (67) and eighty-five (85) degrees, and preferably eighty (80) degrees. In this manner, a maximum reflectivity advantage of the S-polarized light 28z over the P-polarized light 36z may be realized and the ferrule 16 may be protected from damage.

Figure 7:
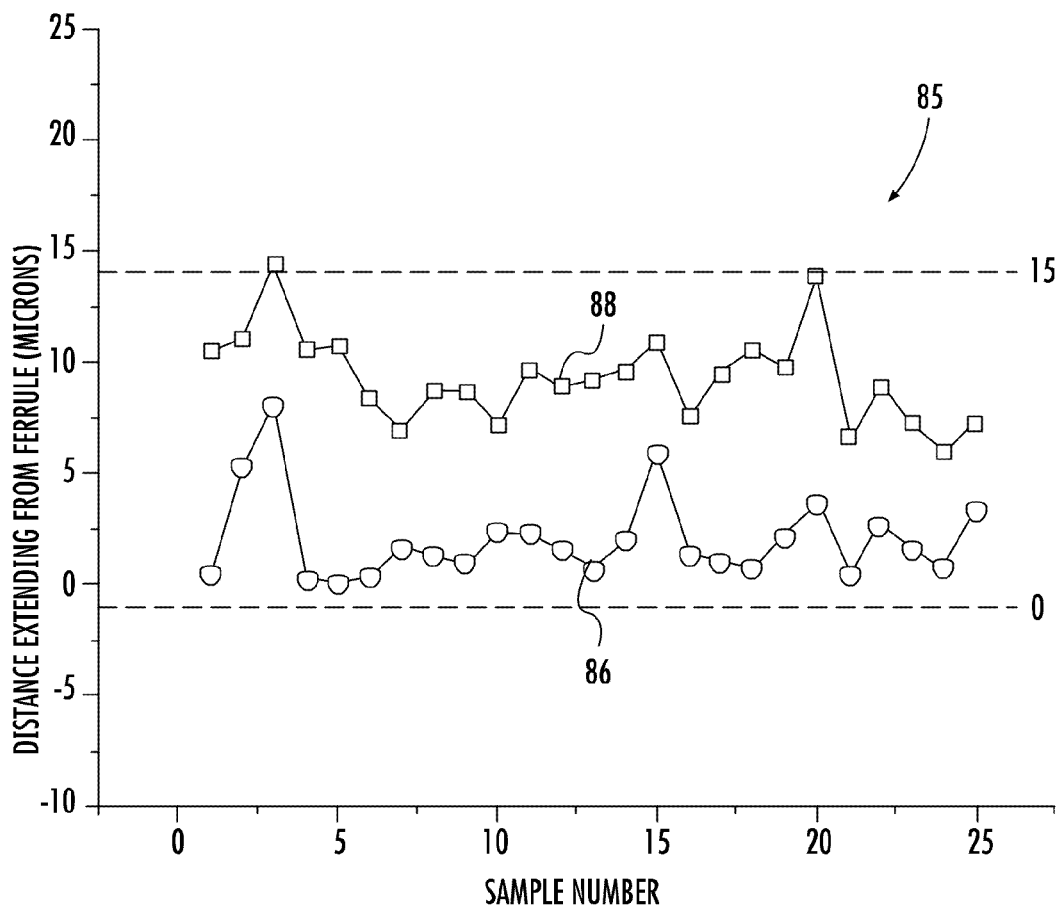
FIG. 7 is a chart of distance data measured from twenty-five (25) samples of optical surfaces that were laser cleaved using the apparatus of FIG. 4A and the distance data illustrating minimum and maximum distances of the optical surfaces which are located no more than fifteen (15) microns away from a geometric plane disposed at (or tangent to) the respective end faces of the ferrules.

Empirical results show that the laser cleaving system 32z(1) may thermally form the optical surface 24 using the S-polarized light 28z incident on the ferrule 16 with a precisely-controlled value of the incidence angle θ (theta) to avoid thermal damage to the ferrule 16. FIG. 7 is a chart 85 of the height $H_1$ (FIG. 2A) measured from twenty-five (25) samples of optical surfaces 24 that were thermally formed using the laser cleaving system 32z(1). The chart 85 includes minimum distances 86 and maximum distances 88 of the height $H_1$ of the optical surfaces 24 from a geometric plane $P_1$ (FIG. 2A) disposed at (or tangent to) the end face 20 of the ferrule 16. The minimum distances 86 and the maximum distances 88 of the optical surfaces 24 are all disposed outside the ferrules 16 and within fifteen (15) microns of the geometric plane $P_1$. Accordingly, mechanical polishing may be minimized to bring the optical surface 24 within a few microns of the geometric plane $P_1$ and the thermal damage to the ferrule from the laser beam 12z may be eliminated by adjusting the incidence angle θ (theta) and reducing the non-S-polarized light 26z within the laser beam 12z.

Figure 8A:
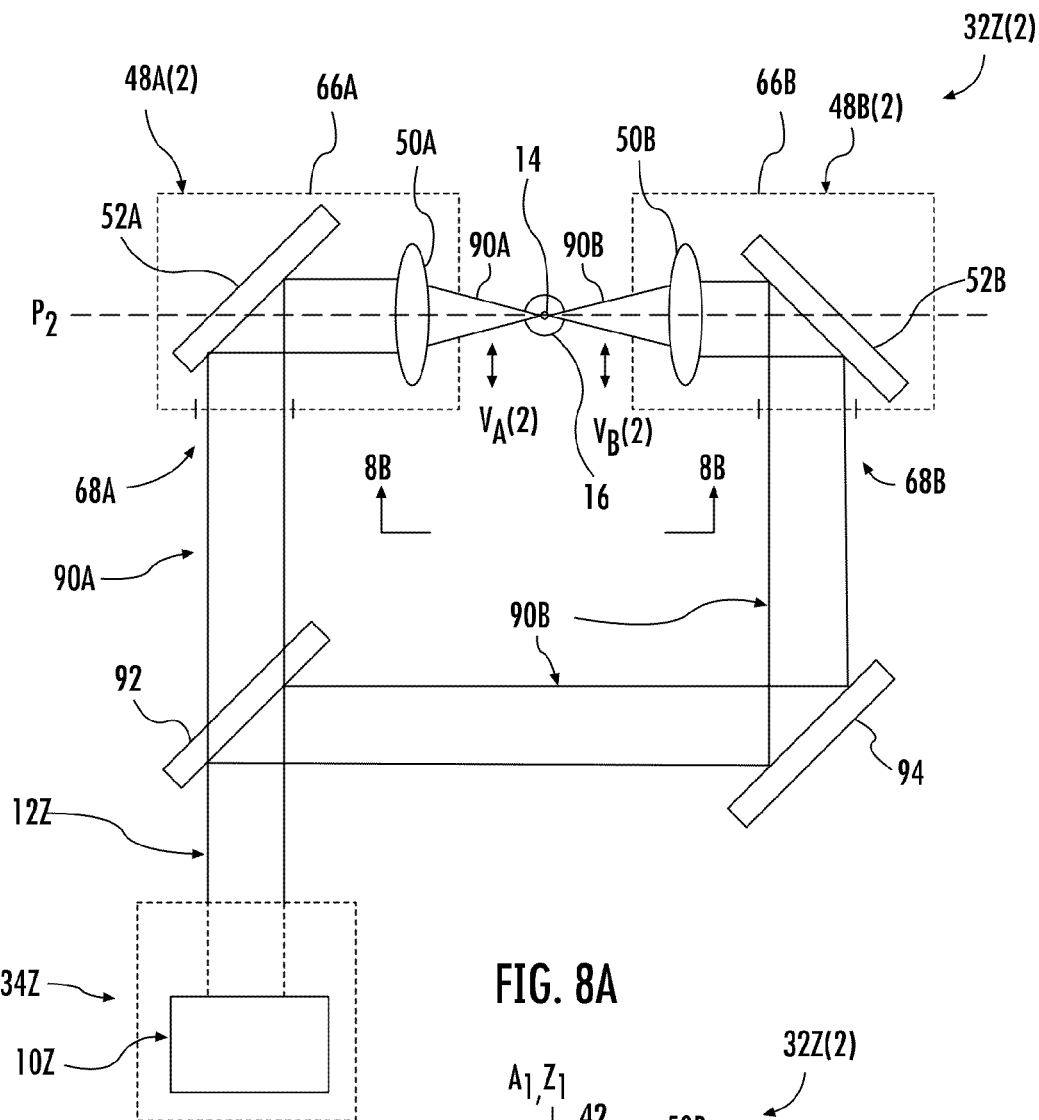
FIGS. 8A and 8B are a schematic diagram and a close-up partial orthogonal diagram, respectively, of another exemplary laser cleaving system for thermally forming the optical surface adjacent the ferrule of FIG. 2A that illustrate major components of the laser cleaving system, including translating reflective mirrors and a plurality of secondary laser beams directed to an optical fiber.
Figure 8B:
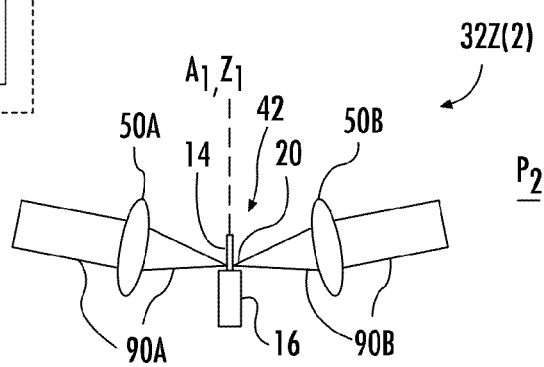

Other examples of laser cleaving systems may be possible to improve the quality of the optical surface 24 formed at the optical fiber 14. FIGS. 8A and 8B are a schematic diagram and a close-up partial orthogonal diagram, respectively, of another exemplary laser cleaving system 32z(2) for thermally forming the optical surface 24 adjacent to the ferrule 16 of FIG. 2A. The laser cleaving system 32z(2) may be similar to the laser cleaving system 32z(1) and so only differences will be discussed in detail for clarity and conciseness.

The laser cleaving system 32z(2) may include focusing-scanning systems 48A(2), 48B(2) which, respectively, direct portions 90A, 90B of the laser beam 12z comprising the S-polarized light 28z to the end portion 42 of the optical fiber 14 and to the ferrule 16 at the incidence angle θ (theta) similar to the focusing-scanning system 48(1) of the laser cleaving system 32z(1). The laser cleaving system 32z(2) may include a beam splitter 92 to direct the portion 90A of the laser beam 12z to the focusing-scanning system 48A(2) and the portion 90B of the laser beam 12z to the focusing-scanning system 48A(2). A reflecting mirror 94 may be used in combination with the beam splitter 92 to direct the portion 90B of the laser beam 12z to the focusing-scanning system 48B(2). The portions 90A, 90B may or may not include a same intensity. The laser cleaving system 32z(2) may improve the quality of the optical surface 24 over the quality produced by the laser cleaving system 32z(1) by directing the portions 90A, 90B to the optical fiber 14 from multiple directions to minimize penetration of the optical fiber 14 and thereby achieving a smoother surface for the optical surface 24.

Moreover, the focusing-scanning systems 48A(2), 48B(2) may also translate with velocities $V_A(2)$ and $V_B(2)$ to scan the portions 90A, 90B of the laser beam 12z, respectively, across the optical fiber 14 to enable a more uniform heat distribution of the laser beam 12z across the optical fiber 14 and thereby improve the uniform quality of the optical surface 24 produced. The velocities $V_A(2)$ and $V_B(2)$ may be the same or equal to the velocity V(1) of laser cleaving system 32z(1).

Figure 9A:
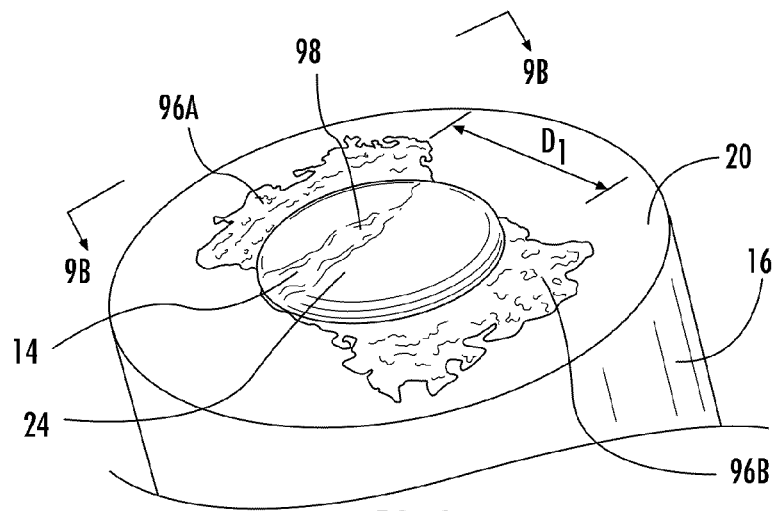
FIGS. 9A and 9B are a top perspective view and a top view, respectively, of an exemplary optical surface of an optical fiber extending from an end face of a ferrule.
Figure 9B:
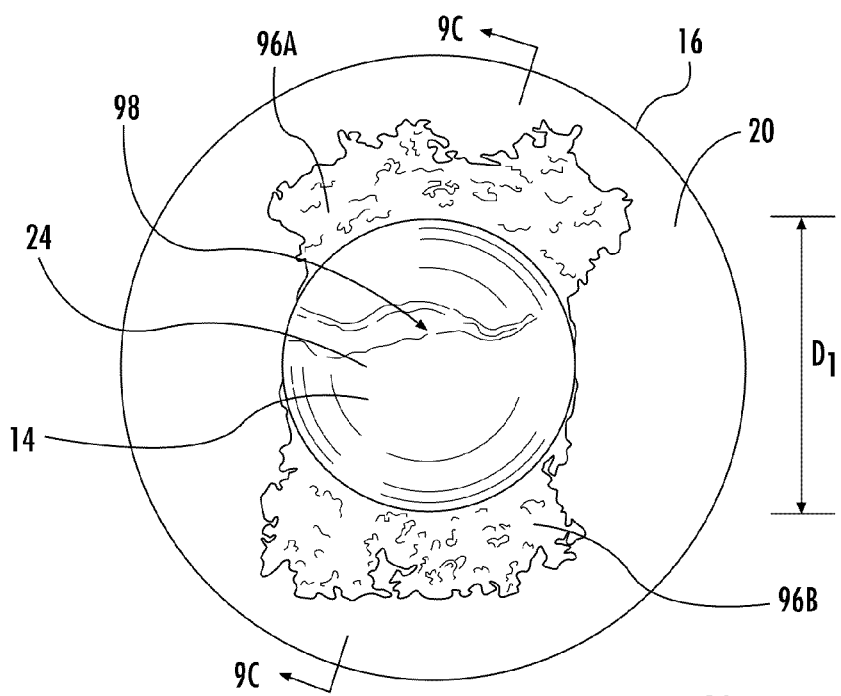
Figure 9C:
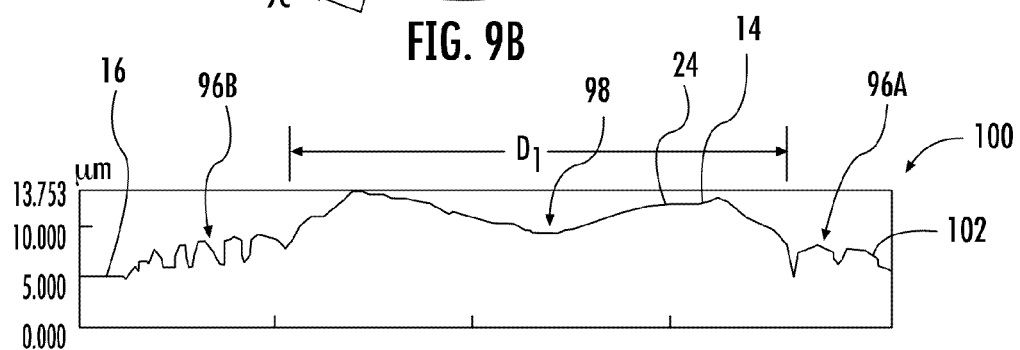
FIG. 9C is a chart of elevation measurements of the optical surface and the end face of FIG. 9B.

The quality of the optical surface 24 of the optical fiber 14 formed with the laser cleaving system 32z(2) may be readily observed by viewing an actual specimen of the optical surface 24. FIGS. 9A and 9B are a top perspective view and a top view, respectively, of an exemplary optical surface 24 of an optical fiber 14 extending from an end face 20 of a ferrule 16. Ablated material of the optical fiber 14 generated by the thermal forming of the optical surface 24 may be disposed as ablated material buildup areas 96A, 96B on the end face 20 of the ferrule 16. The optical surface 24 may include a depression 98 identifying where the portions 90A, 90B of the laser beam 12z both locally contributed energy. FIG. 9C is a chart 100 of elevation measurements 102 of the optical surface 24 and the end face 20 of FIG. 9B. The elevation measurements 102 comprise values for the optical surface 24 that extend less than fourteen (14) microns outside the ferrule 16 and are relatively smooth.

The ablated material buildup areas 96A, 96B may be efficiently removed. FIGS. 10A and 10B are top close-up views of another exemplary optical surface 24 of an optical fiber 14 formed with the laser cleaving system 32z(2) extending from an end face 20 of a ferrule 16 after laser cleaving observed at a first magnification and a second magnification, respectively. Similar to FIG. 9A, the ablated material buildup areas 96A, 96B may be collected on the end face 20, and the optical surface 24 includes the depression 98. FIGS. 11A and 11B are top close-up views of the optical surface 24 and the end face 20 of FIGS. 10A and 10B, respectively, at different magnifications after subsequent wiping with isopropyl alcohol. The ablated material buildup areas 96A, 96B may be reduced as well as the depression 98. FIGS. 12A and 12B are top close-up views of the optical surface and the end face of FIGS. 11A and 11B, respectively, after subsequent hand polishing. The ablated material buildup areas 96A, 96B and the depression 98 may appear gone.

Figure 13A:
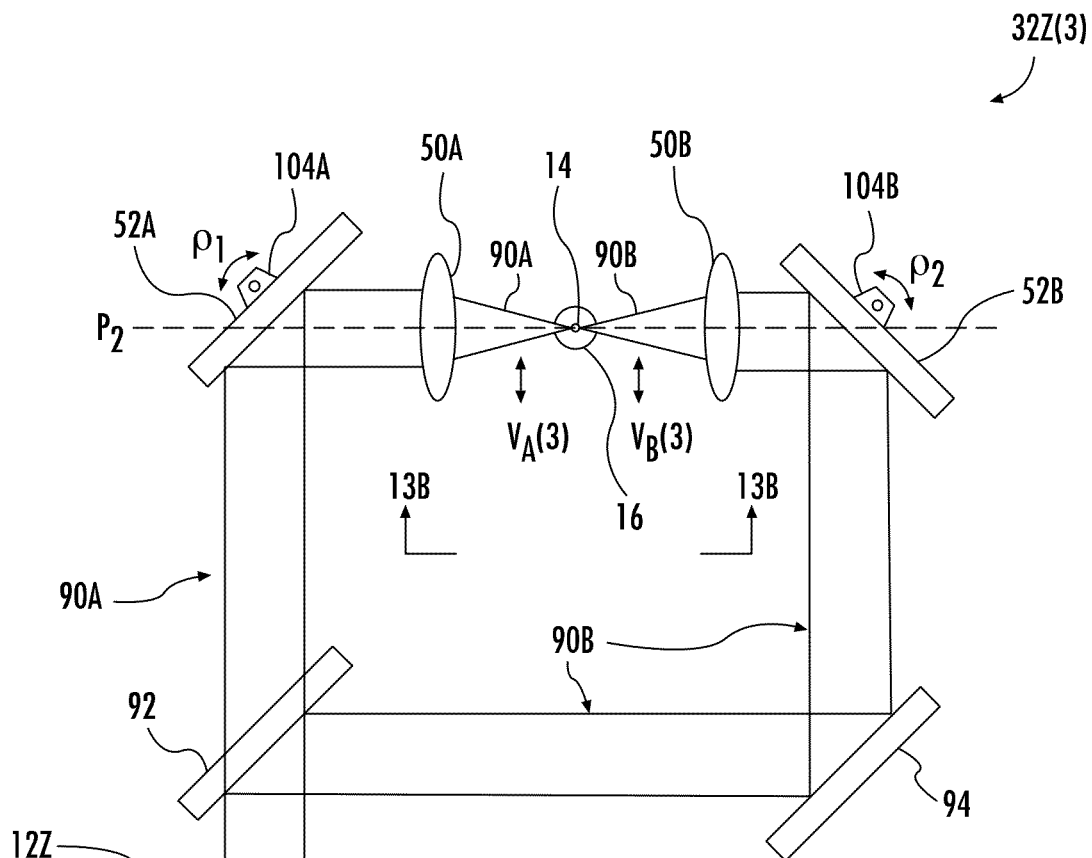
FIGS. 13A and 13B are a schematic diagram and a close-up partial orthogonal diagram, respectively, of another exemplary laser cleaving system for thermally forming the optical surface adjacent the ferrule of FIG. 2A that illustrate major components of the laser cleaving system, including angularly cycling reflective mirrors and a plurality of secondary laser beams directed to an optical fiber.
Figure 13B:
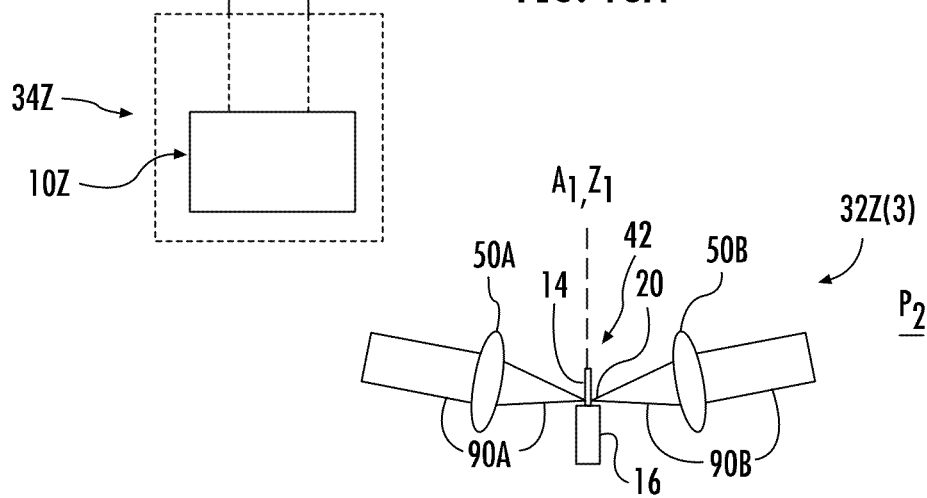

There are other systems that may form the optical surface 24. FIGS. 13A and 13B are a schematic diagram and a close-up partial orthogonal diagram, respectively, of another exemplary laser cleaving system 32z(3) for thermally forming the optical surface 24 adjacent the ferrule 16 of FIG. 2A. The laser cleaving system 32z(3) may be similar to the laser cleaving system 32z(2) and only differences will be discussed for clarity and conciseness.

The laser cleaving system 32z(3) may scan the portions 90A, 90B of the laser beam 12z across the optical fiber 14 as directed by reflective mirrors 52A, 52B with velocities $V_A(3)$, $V_B(3)$, respectively. In one embodiment, the velocities $V_A(3)$, $V_B(3)$ may be one (1) meter per second, and may be the same or different than the velocities $V_A(2)$, $V_B(2)$ of the laser cleaving system 32z(2). The reflective mirrors 52A, 52B may move independent of the focusing lenses 50A, 50B, respectively. The reflective mirrors 52A, 52B may be attached to powered pivoting mechanisms 104A, 104B which angularly cycle the focusing lenses 50A, 50B with angular speeds ρ1, ρ2 (rho1, rho2) to cause the portions 90A, 90B of the laser beam 12z to be scanned across the optical fiber 14 with the velocities $V_A(3)$, $V_B(3)$. In this manner, the portions 90A, 90B of the laser beam 12z may be scanned across the optical fiber 14 more energy efficiently by not moving the focusing lenses 50A, 50B.

Figure 14:
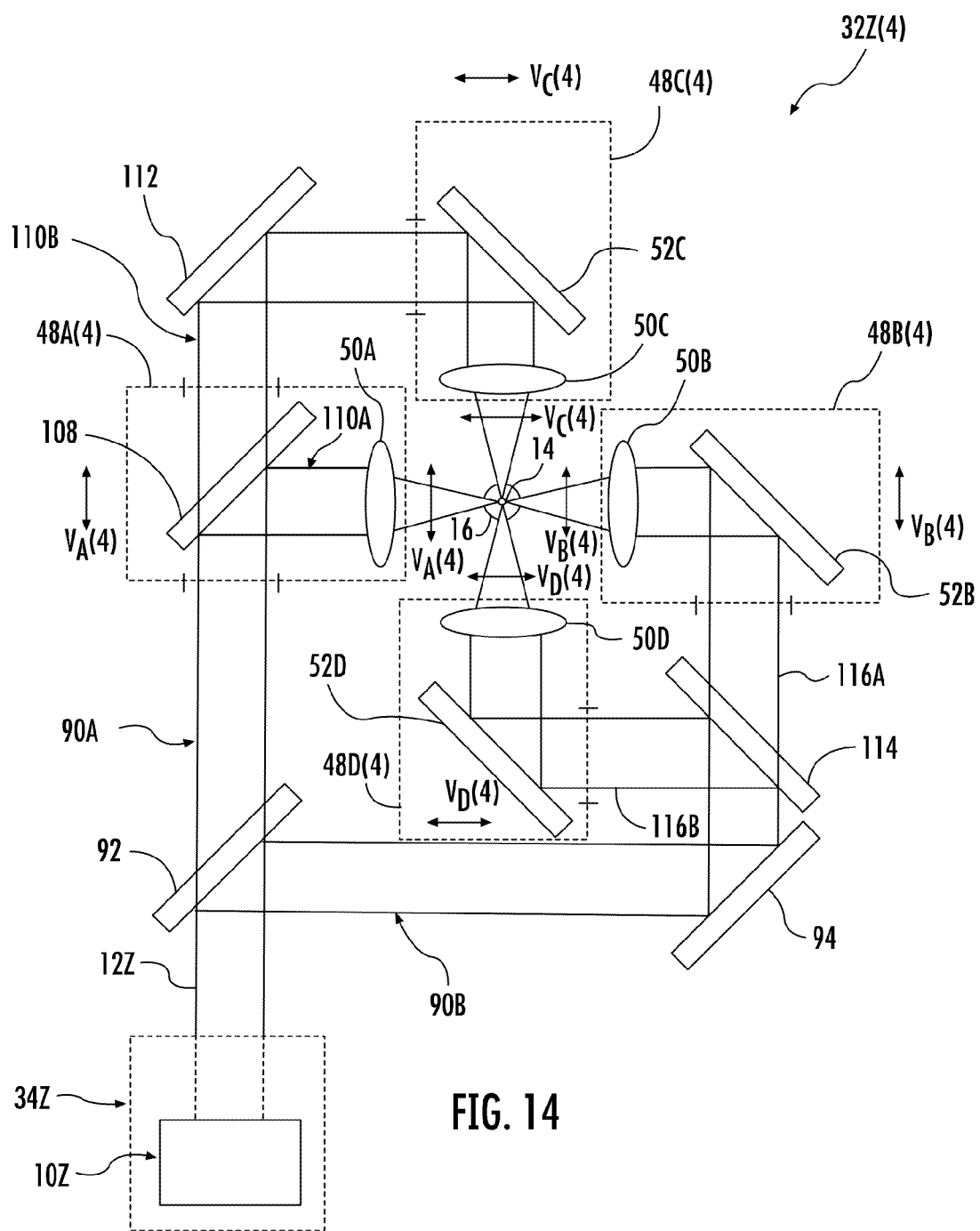
FIG. 14 is a schematic diagram of another exemplary laser cleaving system for thermally forming the optical surface adjacent the ferrule of FIG. 2A that illustrates major components of the laser cleaving system, including focusing-scanning systems which translate and four (4) secondary laser beams directed to an optical fiber.

A smoothness of the optical surface 24 may be improved by cleaving the optical fiber 14 from additional directions. FIG. 14 is a schematic diagram of another exemplary laser cleaving system 32z(4) for thermally forming the optical surface 24 adjacent the ferrule 16 of FIG. 2A. The laser cleaving system 32z(4) may be similar to the laser cleaving system 32z(2) and only differences will be discussed for clarity and conciseness.

The laser cleaving system 32z(4) may include a focusing-scanning system 48A(4) similar to the focusing-scanning system 48(1) of FIG. 4A except the reflective mirror 52A may be replaced by a beam splitter 108 to split the portion 90A of the laser beam 12z into second portions 110A, 110B. The focusing-scanning system 48A(4) may direct the second portion 110A onto the optical fiber 14 with a scanning velocity of $V_A(4)$. The second portion 110B may be received by a reflective mirror 112 which may direct the second portion 110B to a focusing-scanning system 48C(4) which may translate with velocity $V_C(4)$ and may focus and scan the second portion 110B upon the optical fiber 14 with the velocity $V_C(4)$. The focusing-scanning system 48C(4) may operate similarly and include similar components as the focusing-scanning system 48(1) of FIG. 4A.

The laser cleaving system 32z(4) may also include a beam splitter 114 to split the portion 90B of the laser beam 12z into third portions 116A, 116B, respectively. The third portion 116A may be directed by the beam splitter 114 to a focusing-scanning system 48B(4) to be scanned and focused upon the optical fiber 14 with a velocity $V_B(4)$. The third portion 116B may be directed to the focusing-scanning system 48D(4) to be scanned and focused upon the optical fiber 14 with the velocity $V_D(4)$. The focusing-scanning systems 48B(4), 48D(4) may operate similarly and include similar components as the focusing-scanning system 48(1) (FIG. 4A). In this manner, four (4) laser beams, including the second portions 110A, 110B and the third portions 116A, 116B, may be focused and scanned upon the optical fiber 14 to form the optical surface 24 with a smooth surface to minimize or eliminate mechanical polishing.

Figure 15:
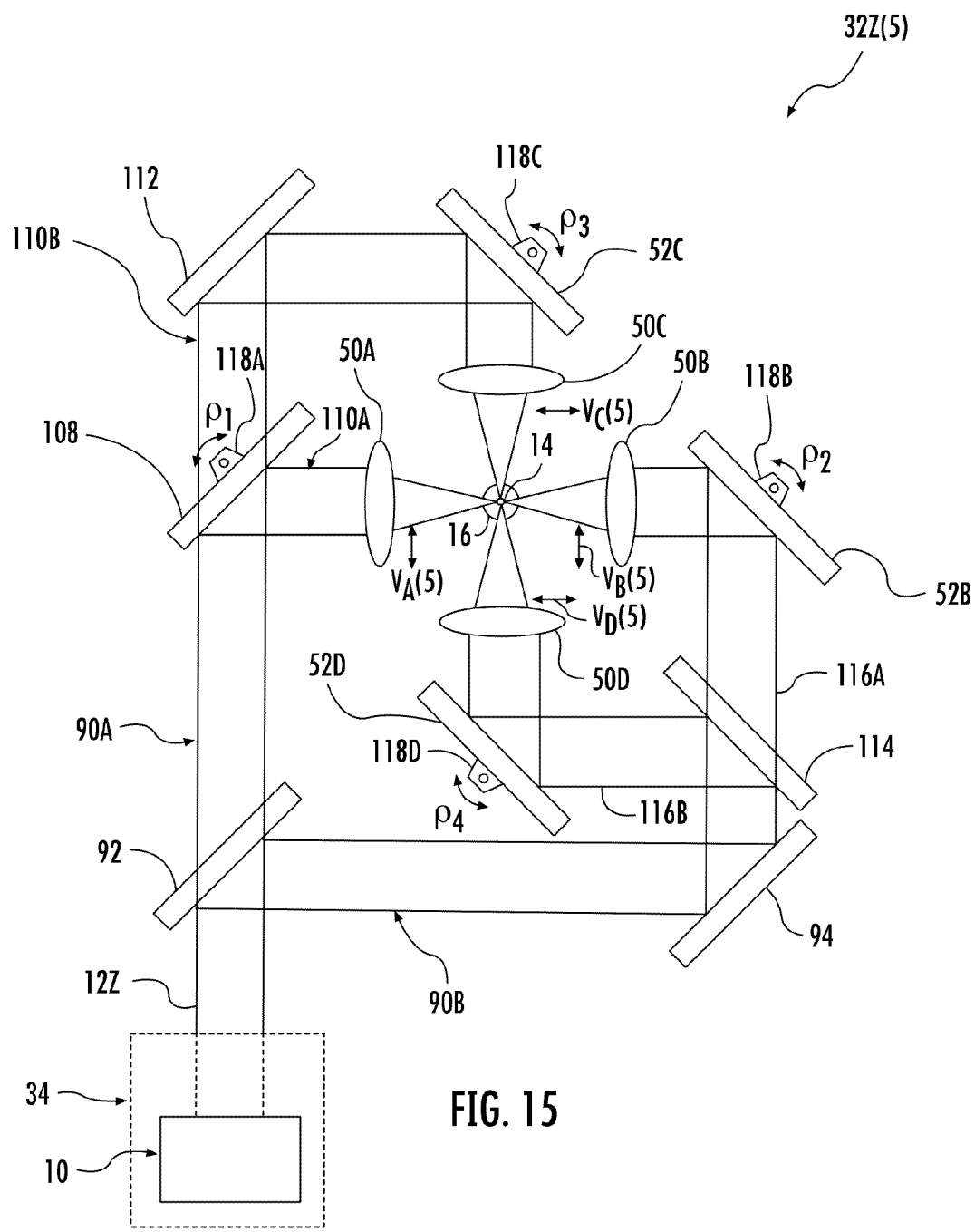
FIG. 15 is a schematic diagram of another exemplary laser cleaving system which is similar to the laser cleaving system of FIG. 14, but providing pivoting mechanisms configured to scan the four (4) secondary laser beams across the optical fiber with angular cycling.

FIG. 15 is a schematic diagram of another exemplary laser cleaving system 32z(5) for thermally forming the optical surface 24 adjacent the ferrule 16 of FIG. 2A. The laser cleaving system 32z(5) may be similar to the laser cleaving system 32z(4) and only differences will be discussed for clarity and conciseness.

The laser cleaving system 32z(5) may include the four laser beams including the second portions 110A, 110B and the third portions 116A, 116B which may be focused and scanned upon the optical fiber 14 to form the optical surface 24 with a smooth surface to minimize or eliminate mechanical polishing. However, the reflective mirrors 52B, 52C, 52D may move independent of the focusing lenses 50B, 50C, 50D, respectively. The beam splitter 108 may also move independent of the focusing lens 50A. In one embodiment the beam splitter 108 may be attached to pivoting mechanism 118A and the reflective mirrors 52B, 52C, 52D may be attached to pivoting mechanisms 118B, 118C, 118D, respectively. The pivoting mechanisms 118A-118D may angularly cycle the beam splitter 108 and the reflective mirrors 52B, 52C, 52D with angular speeds ρ1, ρ2, ρ3, ρ4 (rho1, rho2, rho3, rho4), respectively, which may be, for example, twenty (20) *radians per second*. In this manner, the pivoting mechanisms 118A-

118D may to cause the four (4) laser beams including the second portions 110A, 110B and the third portions 116A, 116B to be focused and scanned upon the optical fiber 14 with velocities $V_A(5)$-$V_D(5)$, respectively, to form the optical surface 24 with a smooth surface to minimize or eliminate mechanical polishing. In one embodiment, the velocities $V_A(5)$-$V_D(5)$ may be one (1) meter per second, and may be the same or different than the velocities $V_A(4)$-$V_D(4)$ of the laser cleaving system 32z(4).

Figure 16:
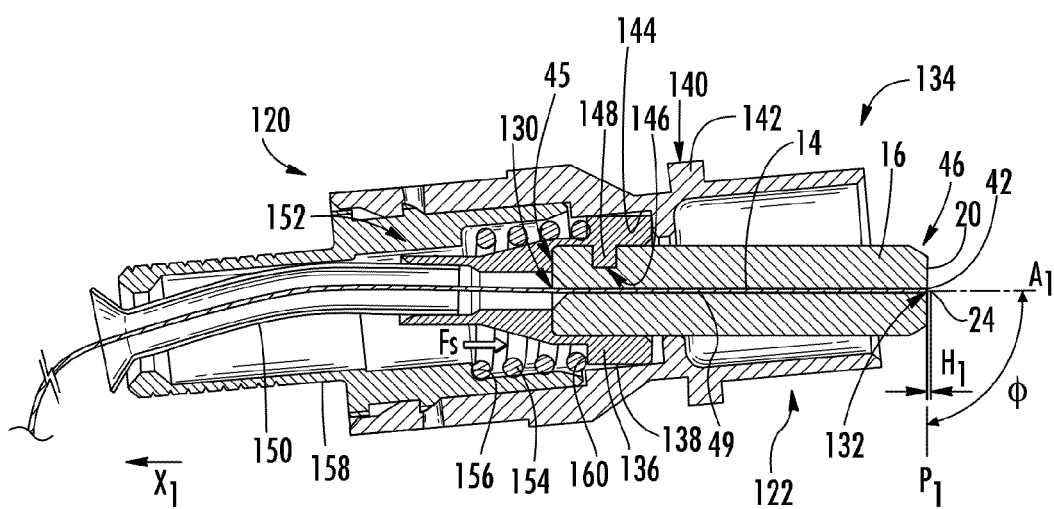
FIG. 16 is a right side cross-sectional view of an exemplary fiber optic connector sub-assembly comprising a ferrule assembly that includes an exemplary ferrule having an optical fiber disposed therethrough with an optical surface thermally formed by a laser beam which comprised at least ninety (90) percent linearly polarized or substantially linearly polarized light incident upon an end face of the ferrule as S-polarized light.

The concept of reducing or eliminating thermal heating 30P (FIG. 1A) by using the laser beam 12z comprising the at least ninety (90) percent of the S-polarized light 28z incident on the ferrule 16 with the incidence angle ϕ has been discussed above. FIG. 16 depicts a right-side cross-sectional view of an exemplary fiber optic connector sub-assembly 120 to provide background to an exemplary implementation of the optical surface 24 of the optical fiber 14 and the end face 20 of the ferrule 16. In this regard, the fiber optic connector sub-assembly 120 includes a ferrule assembly 40 having the ferrule 16 and the optical fiber 14 both having the ability to absorb thermal energy from the laser beam 12z (FIG. 2A) having the wavelength λ. The optical surface 24 is formed adjacent to the ferrule 16, as illustrated in FIG. 16, to facilitate optical transfer with another optical fiber in another fiber optic connector.

The ferrule 16 laterally and angularly aligns the end portion 42 of the optical fiber 14 at the end face 20 of the ferrule 16. The ferrule 16 includes the first end 45, the second end 46, and the ferrule bore 49 (also known as a "microbore") extending between the first end 45 and the second end 46. The optical fiber 14 is disposed through the ferrule bore 49 that extends along the optical axis $A_1$ of the ferrule 16. A first opening 130 is disposed at the first end 45 of the ferrule 16. The first opening 130 provides a passageway by which the end portion 42 of the optical fiber 14 may enter the ferrule bore 49 of the ferrule 16. The first opening 130 may be cone-shaped to provide easy entry of the optical fiber 14 into the ferrule bore 49. The end portion 42 of the optical fiber 14 exits the ferrule bore 49 and extends past the end face 20 of the ferrule 16 through a second opening 132 in the second end 46 of the ferrule 16 to extend to the height $H_1$ after thermal forming. The optical fiber 14 may be secured within the ferrule bore 49 with a bonding agent. The bonding agent may prevent movement of the optical fiber 14 within the ferrule bore 49 to minimize signal attenuation between the optical fiber 14 and the complementary receptacle (not shown), which may include an opposing optical fiber to optically communicate with the optical fiber 14. Movement of the optical fiber 14 within the ferrule bore 49 may be undesirable because the movement may cause attenuation.

With continuing reference to FIG. 16, the ferrule 16 may be disposed at a front end 134 of the fiber optic connector sub-assembly 120. The first end 45 of the ferrule 16 may be at least partially disposed within a ferrule holder body 136. The ferrule holder body 136 supports the ferrule 16 within the fiber optic connector sub-assembly 120. The ferrule holder body 136 may support the ferrule 16 which includes the end face 20 orthogonal to the optical axis $A_1$ or angled at the angle ϕ (phi) with respect to the optical axis $A_1$. For example, the angle ϕ (phi) may be within ten (10) degrees of orthogonal with respect to the optical axis $A_1$, as depicted in FIG. 16. The angle ϕ (phi) may be angled to be non-orthogonal to increase the contact area between the optical fiber 14 and another optical fiber of the complementary receptacle (not shown).

The ferrule holder body 136 may include a body alignment surface 138 which may be disposed to allow easy insertion of the ferrule holder body 136 within a housing 140 of the fiber optic connector sub-assembly 120. The housing 140 in this embodiment includes an inner housing 142 including a housing alignment surface 144. The second end 46 of the ferrule 16 may be at least partially disposed within the inner housing 142. In this regard, the ferrule 16 may be protected from random perturbation forces ("side loads") orthogonal to the optical axis $A_1$ when disengaged from the complementary receptacle (not shown). The ferrule 16 may also include a ferrule notch 146. The ferrule notch 146 may be filled with a portion 148 of the ferrule holder body 136 to prevent the ferrule 16 from disengaging from the ferrule holder body 136. The ferrule holder body 136 may comprise molded plastic, as a non-limiting example.

With continuing reference to FIG. 16, the fiber optic connector sub-assembly 120 may also include a lead-in tube 150 engaged to a rear end 152 of the ferrule holder body 136 to facilitate alignment of the optical fiber 14. The lead-in tube 150 generally restricts a location of the bonding agent used during installation of the optical fiber 14 and the lead-in tube 150 prevents the bonding agent from escaping. Otherwise, the bonding agent may come into contact with other areas of the fiber optic connector sub-assembly 120, such as a spring (discussed below), which must be free to move unfettered by the bonding agent. The lead-in tube 150 also facilitates guiding the end portion 42 of the optical fiber 14 into the ferrule holder body 136, where the optical fiber 14 can then be guided to the ferrule 16. The lead-in tube 150 may also prevent sharp bends from occurring in the optical fiber 14 during insertion that could damage the optical fiber 14 as the end portion 42 of the optical fiber 14 is disposed in the ferrule holder body 136 and into the ferrule 16.

The lead-in tube 150 may be made of a flexible and resilient material with high surface lubricity, for example, polyethylene, silicone, or thermoplastic elastomer. This material may also include additives, for example, mineral fill or silica-based lubricant or graphite. In this manner, the optical fiber 14 may smoothly travel the lead-in tube 150 without being caught during insertion.

With continuing reference to FIG. 16, a spring 154 may be disposed between a spring seat base 156 of a crimp body 158 attached to the inner housing 142 and a spring seating surface 160 of the ferrule holder body 136. The spring 154 may be biased to apply a spring force $F_S$ to the spring seating surface 160 to push the ferrule holder body 136 and thereby push the end face 20 of the ferrule 16 against a complementary receptacle. When contact may be made between the end face 20 of the ferrule 16 and a complementary receptacle, the ferrule holder body 136 translates along a rear direction $X_1$, and the force $F_S$ will press the end face 20 against a complementary receptacle to minimize attenuation.

Figure 17:
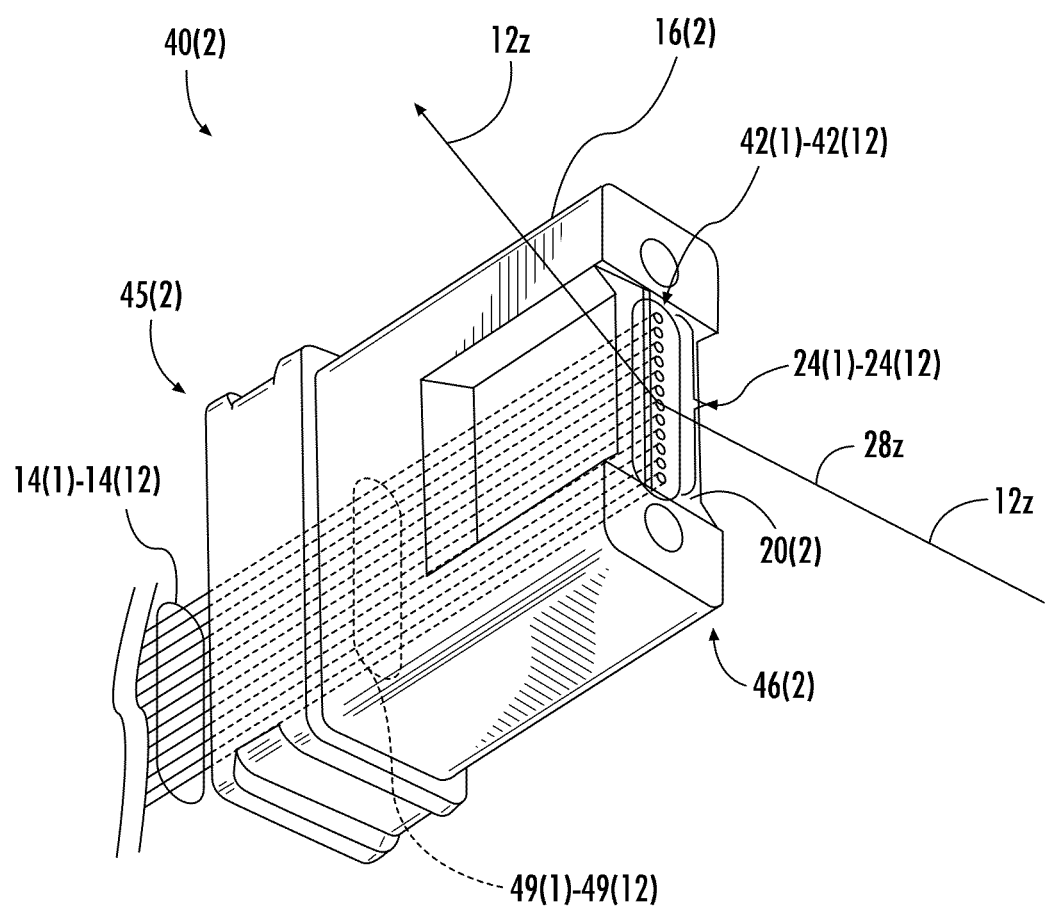
FIG. 17 is a top perspective view of an exemplary ferrule assembly comprising a plurality of optical fibers disposed through a ferrule illustrating optical surfaces of the optical fibers thermally formed by a laser beam comprising at least ninety (90) percent linearly polarized or substantially linearly polarized light incident upon an end face of the ferrule as S-polarized light.

It is also noted that a ferrule assembly 40(2) comprising optical fibers 14(1)-14(12) and a ferrule 16(2) is also compatible with the laser cleaving systems 32z(0)-32z(5) and/or the method 44. FIG. 17 is a top perspective view of the ferrule assembly 40(2). The ferrule 16(2) comprises a first end 45(2), a second end 46(2), and ferrule bores 49(1)-49(12) extending between the first end 45(2) and the second end 46(2). End portions 42(1)-42(12) of the optical fibers 14(1)-14(12) are disposed through the ferrule bores 49(1)-49(12) and extend through an end face 20(2) on the second end 46(2) of the ferrule 16(2). The optical fibers 14(1)-14(12) include optical surfaces 24(1)-24(12) formed using one or more of the laser cleaving systems 32z(0)-32z(5) and/or the method 44. The laser beam 12z may be directed to the end face 20(2) of the ferrule 16(2) and to the end portions 42(1)-42(12) of the optical fibers 14(1)-14(12) to thermally form the optical surfaces 24(1)-24(12) at the end portions 42(1)-42(12) of the optical fibers 14(1)-14(12) without damaging the ferrule 16(2). The laser beam 12z comprises at least ninety (90) percent linearly-polarized light configured to be incident on the end face 20(2) of the ferrule 16(2) as S-polarized light 28z. In this manner, mechanical polishing may be eliminated or reduced when forming the optical surfaces 24(1)-24(12).

As used herein, it is intended that terms "fiber optic cables" and/or "optical fibers" include all types of single mode and multi-mode light waveguides, including one or more optical fibers that may be upcoated, uncoated, coated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. Non-limiting examples of bend-insensitive, or bend resistant, optical fibers are ClearCurve® Multimode or single-mode fibers commercially available from Corning Incorporated. Suitable fibers of these types are disclosed, for example, in U.S. Patent Application Publication Nos. 2008/0166094 and 2009/0169163, the disclosures of which are incorporated herein by reference in their entireties.

Many modifications and other variations of the embodiments set forth herein will come to mind to one skilled in the art to which the embodiments pertain having the benefit of the teachings presented in the foregoing descriptions and the associated drawings.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A method of thermally forming an optical surface on an end portion of an optical fiber, comprising:
   providing a ferrule having a first end, a second end, and a ferrule bore extending between the first end and the second end;
   disposing an optical fiber through the ferrule bore and extending the optical fiber through an end face on the second end of the ferrule;
   emitting a laser beam from an optical system including a laser, the laser beam comprising at least ninety (90) percent linearly-polarized light and configured to be incident on the ferrule as S-polarized light; and
   directing the laser beam to the end face of the ferrule and to an end portion of the optical fiber extending from the end face of the ferrule to thermally form an optical surface at the end portion of the optical fiber.

2. The method of claim 1, further comprising directing the linearly-polarized light of the laser beam upon the end face of the ferrule at an incidence angle to increase a percentage point reflectivity difference at the end face of the ferrule between the S-polarized light of the laser beam and P-polarized light having a wavelength of the laser beam to within five (5) percentage points of a maximum percentage point reflectivity difference.

3. The method of claim 2, wherein the directing the linearly-polarized light comprises the incidence angle between sixty-seven (67) and eighty-five (85) degrees.

4. The method of claim 1, wherein the emitting the laser beam comprises the laser including a carbon dioxide laser, and the providing the ferrule comprises the ferrule including zirconium oxide.

5. The method of claim 1, wherein the directing the laser beam comprises forming the optical surface within fifteen (15) microns of the end face of the ferrule.

6. The method of claim 1, wherein the directing the laser beam comprises the optical fiber including silicon dioxide.

7. The method of claim 1, wherein the emitting the laser beam comprises the laser beam including one-hundred (100) percent linearly-polarized light incident on the ferrule as S-polarized light.

8. A laser cleaving system for thermally forming an optical surface on an end portion of an optical fiber, comprising:
   an optical system including a laser configured to emit a laser beam having at least ninety (90) percent linearly-polarized light; and
   a fixture configured to secure an end face of a ferrule and an end portion of an optical fiber extending from the end face of the ferrule so that the laser beam is incident upon the end portion of the optical fiber and the end face of the ferrule,
   wherein the linearly-polarized light is directed to be incident on the ferrule as S-polarized light.

9. The laser cleaving system of claim 8, wherein the optical system is configured to direct the laser beam upon the end face of the ferrule at an incidence angle to increase a percentage point reflectivity difference at the end face of the ferrule between the S-polarized light of the laser beam and P-polarized light having a wavelength of the laser beam to within five (5) percentage points of a maximum percentage point reflectivity difference.

10. The laser cleaving system of claim 9, wherein the incidence angle is between sixty-seven (67) and eighty-five (85) degrees.

11. The laser cleaving system of claim 8, wherein the laser beam is configured to be directed to the end portion of the optical fiber to form the optical surface within fifteen (15) microns of the end face of the ferrule.

12. The laser cleaving system of claim 9, wherein the wavelength is between 266 nanometers and 11000 nanometers.

13. The laser cleaving system of claim 8, wherein the laser comprises a carbon dioxide laser.

14. The laser cleaving system of claim 8, wherein the ferrule comprises zirconium oxide.

15. The laser cleaving system of claim 8, wherein the optical fiber comprises silicon dioxide.

16. The laser cleaving system of claim 8, further comprising at least one reflective mirror configured to sweep the laser beam across the end portion of the optical fiber.

17. The laser cleaving system of claim 8, further comprising a focusing lens configured to focus the laser beam towards the end portion of the optical fiber and the end face of the ferrule.

18. The laser cleaving system of claim 8, further comprising a beam splitter and a plurality of reflective mirrors which are configured to split the laser beam into portions of the laser beam directed independently upon the end portion of the optical fiber from different directions.

19. A method of thermally forming an optical surface on an end portion of an optical fiber, comprising:
   providing a ferrule having a first end, a second end, and a ferrule bore extending between the first end and the second end;

disposing an optical fiber through the ferrule bore and extending the optical fiber through an end face on the second end of the ferrule;

emitting a laser beam from an optical system including a laser, the laser beam comprising at least ninety (90) percent linearly-polarized light; and directing the laser beam to the end face of the ferrule and to an end portion of the optical fiber extending from the end face of the ferrule to thermally form an optical surface at the end portion of the optical fiber, the laser beam is directed upon the end portion of the optical fiber and the end face of the ferrule at an incidence angle to increase a percentage point reflectivity difference at the end face of the ferrule between an S-polarized light of the laser beam and P-polarized light having a wavelength of the laser beam to within five (5) percentage points of a maximum percentage point reflectivity difference, wherein the laser comprises a carbon dioxide laser, the ferrule comprises zirconium oxide, and the optical fiber comprises silicon dioxide.

20. The method of claim 19, wherein the directing the laser beam comprises forming the optical surface within fifteen (15) microns of the end face of the ferrule.

\* \* \* \* \*